United States Patent
Pullen et al.

(10) Patent No.: US 10,950,857 B2
(45) Date of Patent: *Mar. 16, 2021

(54) POLYCRYSTALLINE METAL OXIDES WITH ENRICHED GRAIN BOUNDARIES

(71) Applicant: CAMX Power LLC, Lexington, MA (US)

(72) Inventors: Adrian W. Pullen, Boston, MA (US); David Ofer, Needham, MA (US); Suresh Sriramulu, Arlington, MA (US); Kenan Sahin, Lexington, MA (US); Jane Rempel, Arlington, MA (US)

(73) Assignee: CAMX Power LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,622

(22) Filed: Jan. 17, 2019

(65) Prior Publication Data

US 2020/0235389 A1    Jul. 23, 2020

(51) Int. Cl.
    *C01G 53/00*     (2006.01)
    *H01M 4/02*     (2006.01)
    (Continued)

(52) U.S. Cl.
    CPC ............ *H01M 4/525* (2013.01); *C01G 53/42* (2013.01); *C01G 53/66* (2013.01);
    (Continued)

(58) Field of Classification Search
    CPC .. H01M 4/525; H01M 2004/028; C01G 53/42
    (Continued)

(56) References Cited

U.S. PATENT DOCUMENTS

| | | |
|---|---|---|
| 6,071,649 A | 6/2000 | Mao et al. |
| 6,921,609 B2 | 7/2005 | Lampe-Onnerud et al. |

(Continued)

FOREIGN PATENT DOCUMENTS

| | | |
|---|---|---|
| CN | 101071857 A | 11/2007 |
| CN | 107591519 A | 1/2018 |

(Continued)

OTHER PUBLICATIONS

Lim, et al., Advanced functional Materials, 2015; vol. 25, pp. 4673-4680.

(Continued)

*Primary Examiner* — Sarah A. Slifka
(74) *Attorney, Agent, or Firm* — Dinsmore & Shohl LLP; Weston R. Gould

(57) ABSTRACT

Provided are electrochemical cells that include as a cathode active material within the cathode of the cell secondary particles that provide excellent capacity and improved cycle life. The particles are characterized by grain boundaries between adjacent crystallites of the plurality of crystallites and comprising a second composition having a layered α-NaFeO₂-type structure, a cubic structure, a spinel structure, or a combination thereof, wherein the electrochemically active cathode active material has an initial discharge capacity of 180 mAh/g or greater; and wherein the electrochemical cell has an impedance growth at 4.2V less than 50% for greater than 100 cycles at 45° C.

18 Claims, 19 Drawing Sheets

(51) Int. Cl.
*H01M 4/525* (2010.01)
*H01M 10/052* (2010.01)

(52) U.S. Cl.
CPC ...... *C01P 2002/20* (2013.01); *C01P 2002/32* (2013.01); *C01P 2002/70* (2013.01); *C01P 2002/85* (2013.01); *C01P 2004/04* (2013.01); *C01P 2006/40* (2013.01); *H01M 10/052* (2013.01); *H01M 2004/028* (2013.01)

(58) Field of Classification Search
USPC .......................................................... 429/223
See application file for complete search history.

(56) References Cited

U.S. PATENT DOCUMENTS

| | | |
|---|---|---|
| 7,381,496 B2 | 6/2008 | Onnerud et al. |
| 8,790,827 B2 | 7/2014 | Yanagihara et al. |
| 9,209,455 B2 | 12/2015 | Ofer et al. |
| 9,391,317 B2 | 7/2016 | Ofer et al. |
| 2005/0181280 A1 | 8/2005 | Ceder et al. |
| 2005/0188128 A1 | 8/2005 | Koshiba |
| 2008/0131782 A1 | 6/2008 | Hagiwara et al. |
| 2009/0104530 A1 | 4/2009 | Shizuka et al. |
| 2009/0121179 A1 | 5/2009 | Shi |
| 2012/0009474 A1 | 1/2012 | Yanagihara et al. |
| 2012/0028134 A1 | 2/2012 | Kim et al. |
| 2012/0321948 A1* | 12/2012 | Oya .................. H01M 4/131 429/211 |
| 2013/0304375 A1 | 11/2013 | Lee et al. |
| 2015/0079471 A1 | 3/2015 | Fang et al. |
| 2016/0013475 A1* | 1/2016 | Ofer .................. C01G 51/42 252/182.1 |
| 2016/0181611 A1 | 6/2016 | Cho et al. |
| 2018/0013145 A1 | 1/2018 | Choi et al. |
| 2018/0040889 A1 | 2/2018 | Choi et al. |
| 2018/0040890 A1 | 2/2018 | Choi et al. |
| 2018/0040891 A1 | 2/2018 | Choi et al. |
| 2018/0040896 A1 | 2/2018 | Choi et al. |
| 2018/0337401 A1 | 11/2018 | Ni et al. |
| 2019/0355983 A1 | 11/2019 | Zhang et al. |
| 2019/0356015 A1 | 11/2019 | Zhang et al. |

FOREIGN PATENT DOCUMENTS

| | | |
|---|---|---|
| EP | 2023426 A1 | 2/2009 |
| JP | 2000-340226 A | 12/2000 |
| JP | 2008234872 A | 10/2008 |
| JP | 5002872 B2 | 8/2012 |
| JP | 2014-220232 A | 11/2014 |
| JP | 2015213038 A | 11/2015 |
| JP | 5971109 B2 | 8/2016 |
| KR | 1020100099668 | 9/2010 |
| KR | 10-2016-0074236 A | 6/2016 |
| KR | 20190003110 A | 1/2019 |
| WO | 2002103824 | 12/2002 |
| WO | 2005114768 | 12/2005 |
| WO | 2017189887 A1 | 11/2017 |

OTHER PUBLICATIONS

Zuo, et al., Journal of Alloys and compounds, 2017; vol. 706, pp. 24-40.
Kim, et al., Nano Letters, 2015; vol. 15, pp. 2111-2119.
Moses, et al., Applied Surface Science, 2007; vol. 253, No. 10, pp. 4782-4791.
Li, et al., Journal of Alloys and Compounds, 2008; vol. 457, pp. L1-L5.
Lin, et al., Nature Communications, 2014; vol. 5, No. 3529, pp. 1-9.
Kim, et al., Energy Environ. Sci., 2018; vol. 11, pp. 1449-1459.
Lee, et al., Journal of Power Sources, 2015; vol. 273, pp. 663-669.
Jo, et al., Nano Research, 2015; vol. 8, No. 5, pp. 1464-1479.
Zheng, et al., Journal of The Electrochemical Society, 2011; vol. 158, pp. A357-A362.
Wantanabe, et al., Journal of Power Sources, 2014; vol. 258, pp. 210-217.
Kim, et al., Electrochemical and Solid State Letters, 2006; vol. 9, No. 1, pp. A19-A23.
Yan, et al., Nature Communications, 2017; vol. 8, No. 14101, pp. 1-9.
Kim, et al., Journal of Power Sources, 2006; vol. 159, pp. 1328-1333.
Kim, et al., Advanced Materials, 2016; 28:4705-4712.
K. Lee and K. Kim, Journal of the electrochemical Society, 2000; vol. 145, No. 5, pp. 1709-1717.
Yang, et al., Journal of Power sources, 2016; vol. 331, pp. 487-494.

* cited by examiner

POLYCRYSTALLINE METAL OXIDES WITH ENRICHED GRAIN BOUNDARIES

FIELD

Disclosed is polycrystalline metal oxide particle, methods of manufacture thereof, and electrochemical cells or batteries comprising the same.

BACKGROUND

Layered structure lithium nickelate ($LiNiO_2$)-based materials have been developed for Lithium-ion battery cathodes because they generally have lower cost, higher capacity and higher rate capability than the historically predominant $LiCoO_2$ cathode material. However, pure $LiNiO_2$ materials exhibit poor electrochemical stability and cycling performance. To address this, non-nickel, elemental additives have been formulated into $LiNiO_2$ that stabilize the structure improving the cycling performance, but typically at the expense of discharge capacity. As demands for energy density have increased, research has focused on optimizing and reducing these non-nickel additives to capture the capacity of high Ni materials while at the same time maintaining cycling performance.

As such, new materials are needed to address the demands for high capacity materials with long cycle life. The materials provided herein and methods of forming such materials address this need by maintaining high capacity over a long cycle life.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are electrochemical cells, optionally secondary cells, optionally lithium ion secondary cells that include an anode, an electrolyte, and a cathode, the cathode comprising an electrochemically active cathode active material comprising a plurality of particles, said plurality of particles comprising a plurality of crystallites each comprising a first composition comprising lithium, nickel, and oxygen; a grain boundary between adjacent crystallites of the plurality of crystallites and comprising a second composition having a layered α-$NaFeO_2$-type structure, a cubic structure, a spinel structure, or a combination thereof; wherein the electrochemically active cathode active material has an initial discharge capacity of 180 mAh/g or greater; and wherein the electrochemical cell has an impedance growth at 4.2V less than 50% for greater than 100 cycles at 45° C. Electrochemical cells optionally are characterized by an impedance growth at 50% state of charge of less than 50% for greater than 200 cycles at 45° C., optionally less than 120% for greater than 200 cycles at 45° C. In some aspects, an electrochemical cell is characterized by an impedance growth at 50% state of charge of less than 50% for greater than 200 cycles at 45° C. Optionally, each of the crystallites include lithium, nickel, cobalt, and oxygen. Optionally, the crystallites include Al, Mn, Mg, or combinations thereof.

Optionally, the first composition, the second composition or both, in any of the forgoing or other aspects are defined by $Li_{1+x}MO_{2+y}$, wherein $-0.95 \leq x \leq 0.3$, $-0.3 \leq y \leq 0.3$, and wherein M comprises nickel at greater than or equal to 80 atomic percent. Optionally, M in a first composition comprises an atomic percent of nickel greater than or equal to 75 at % relative to total transition metal in the first composition. In a second composition, M is optionally less than or equal to 90 at % relative to total transition metal in the second composition. Optionally, the overall grain boundary comprises cobalt in an amount of about 2 at % to about 99 at %, and aluminum in an amount of about 2 at % to about 99 at %. Optionally, in the first composition, the second composition, or both, M further comprises an additional metal, wherein the additional metal is present in an amount of about 1 at % to about 90 at % relative to total metal in the respective first or second composition; the additional metal is selected from the group consisting of Mg, Sr, Co, Al, Ca, Cu, Zn, Mn, V, Ba, Zr, Ti, Nb, Ta, Cr, Fe, Mo, W, Hf, B, and any combination thereof, whereby the one or more additional elements optionally reside in a Li layer, a M layer, or both.

Optionally, the crystallites comprise cobalt, with the cobalt concentration in the range of 1 at % to about 50 at %, optionally, in the range of 1 at % to about 15 at %% relative to total transition metal the first composition. In some aspects, the crystallites comprise Mn present in an amount of about 1 at % to about 60 at %, and the grain boundary comprises Mn present in an amount of about 1 at % to about 60 at %. In other aspects, the grain boundary comprises Ni, Co, and Al. Optionally, the concentration of Ni in the grain boundary is greater than 75 at %.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

DETAILED DESCRIPTION

Figure 1:
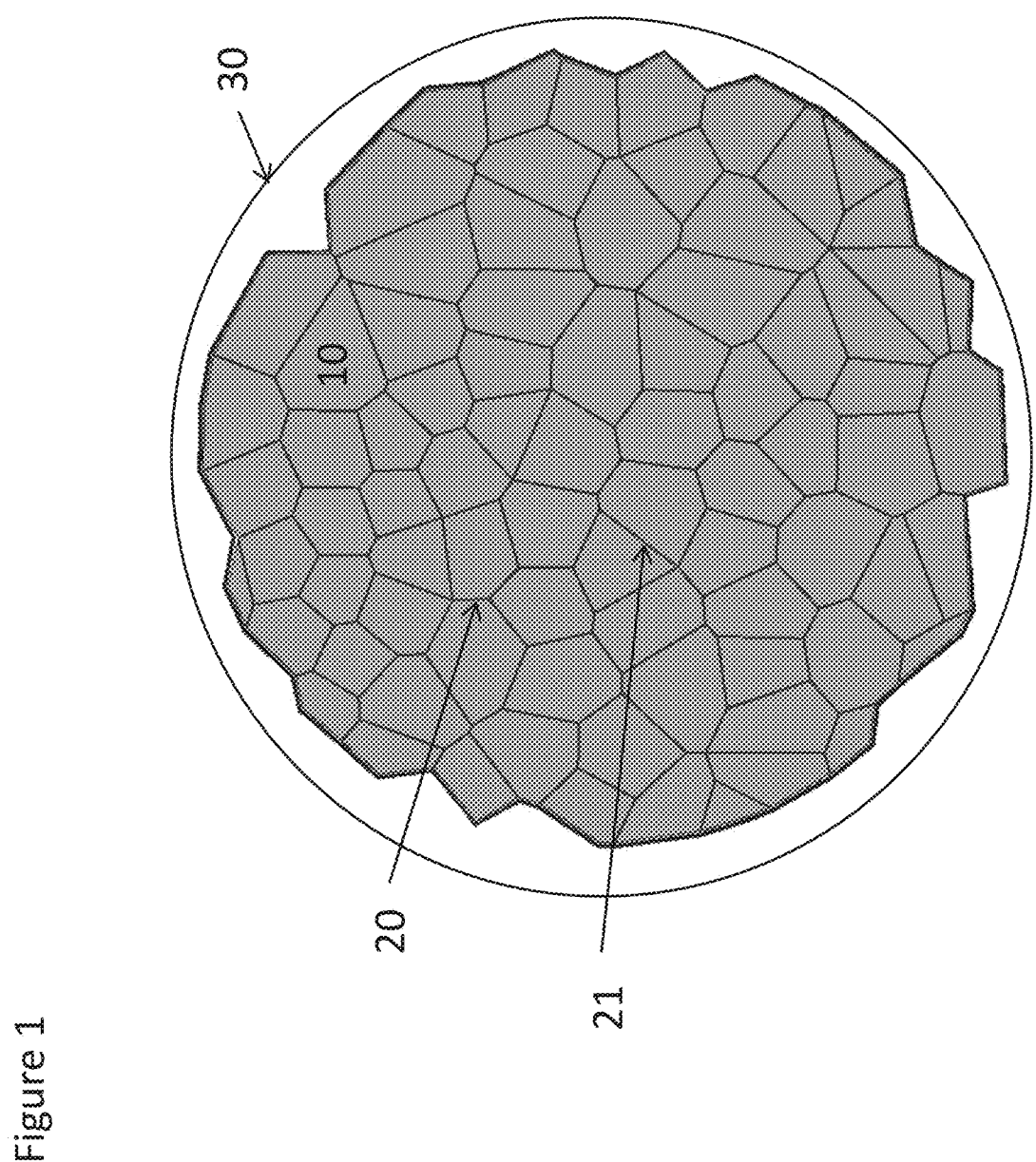
FIG. 1 is a schematic perspective view of a cross-section of a secondary particle as provided according to some aspects as described herein.

The following description of particular aspect(s) is merely exemplary in nature and is in no way intended to limit the scope of the disclosure, its application or uses, which may of course vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, unless specified otherwise, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Ni-based layered materials of the $LiMO_2$ type are dense, polycrystalline agglomerates of primary crystals. These are typically made using standard solid-state processes at temperatures in the range of 600° C. to 900° C. starting from a variety of precursor materials. Precursor materials are typically transition metal hydroxides ($M(OH)_2$), lithium precursors (e.g., LiOH or $Li_2CO_3$), or inorganic precursors for other dopants (e.g., hydroxides, carbonates, nitrates). During heating of the precursor mixture, polycrystalline $LiMO_2$ is formed along with the expulsion of gases such as $H_2O$, $CO_2$ or $NO_2$.

The result of the sintering action under the right conditions and with the proper precursors is the formation of a plurality of primary crystallites that are formed into the larger secondary particle that may serve as the electrochemically active material. It was previously found that the regions between these primary crystallites, the grain boundaries, could be selectively enriched with Co as is found in U.S. Pat. No. 9,209,455. In the present disclosure the inventors have found that significant further improvements can be achieved by replacing some of the enriched Co in the grain boundaries with Al leading to further reductions in impedance growth and improved cycle life. It is understood that a synergistic relationship between the Co and the Al in the grain boundaries, particularly at levels of Co between 2 mole percent Co and 5 mole percent Co (relative to total M content in the crystallites) combined with lower relative levels of Al dramatically reduces impedance growth and improves the cycle life of an electrochemical cell employing the material as a cathode active material.

Accordingly, this disclosure provides improved electrochemically active materials such as those suitable for use in a positive electrode (cathode) for a Li-ion secondary cell that, relative to prior materials, reduce the rate of impedance growth and/or capacity fade during charge/discharge cycling of the battery. Also, provided are a variety of methods for achieving high discharge capacity cathode active materials that show reductions in impedance growth and capacity fade as they are cycled relative to the same materials but absent Co and Al enrichment in the grain boundaries.

The polycrystalline layered-structure lithiated metal oxides as provided herein exhibit enhanced electrochemical performance and stability. The compositions prevent the performance degradation of electrochemically cycled Ni-containing polycrystalline $LiMO_2$-based materials, while maintaining other desirable end-use article properties, e.g., electrochemical capacity of rechargeable lithium-ion cathodes made from such layered metal oxides by reducing the rate of impedance growth during electrochemical cycling. Such Co and Al grain boundary enriched materials may be readily manufactured by calcining a green body formulation including a LiOH and a precursor hydroxide or carbonate to form particles with defined grain boundaries and then enriching the grain boundaries with a combination of Co and Al such that the resulting particles have grain boundaries where the concentration of Co and Al in the grain boundary is greater than prior to enrichment and optionally greater than within the primary crystallites, the outer surfaces of which define the edges of the grain boundaries in the secondary particle.

As such, provided are compositions, systems, and methods of making and using polycrystalline layered-structure lithiated metal oxides having Co and Al enriched grain boundaries in lithium-ion secondary cells as the means of achieving high initial discharge capacity and low impedance growth during cycling, thereby overcoming prior challenges in high-nickel formulations that may also have high discharge capacity (e.g., >205 mAh/g at C/20).

The materials as provided include a particle comprising a plurality of crystallites each comprising a first composition. The particle formed of a plurality of crystallites may be referred to as a secondary particle. The particles as provided herein are uniquely tailored to have grain boundaries between the primary crystallites. Enriching these grain boundaries, subsequent to their formation, with a combination of Co and Al, optionally at particular relative concentrations of Co and Al, results in particles that provide for reduced impedance growth during cycling, improving performance and cycle life of a cell incorporating the particles as a component of a cathode.

The particles are appreciated to include a grain boundary formed of or including a second composition, wherein a concentration of cobalt and aluminum, for example, in the grain boundary is greater than a concentration of cobalt and aluminum, for example, in the primary crystallite adjacent thereto. The concentration of Co and Al in the grain boundary is optionally greater than the average Co and Al concentration within the adjacent crystallites on average. The materials as provided herein are optionally relatively uniform in Co and/or Al concentration (if either is present at all) within the crystallites. Whether uniform or not, the concentration of Co and Al in the grain boundary is greater than the concentration of Co and Al, individually or combined as averaged within an adjacent crystallite. Optionally, the provided materials include a further outer coating layer may be disposed on an outer surface of the secondary particle to provide a coated secondary particle.

In some aspects of the presently provided particles, the first composition includes polycrystalline layered-structure lithiated metal oxides defined by composition $Li_{1+x}MO_{2+y}$ and optionally a cell or battery formed therefrom, where $-0.1 \le x \le 0.3$ and $-0.3 \le y \le 0.3$. In some aspects, x is $-0.1$, optionally 0, optionally 0.1, optionally 0.2, or optionally 0.3. Optionally, x is greater than or equal to $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is $-0.3$, optionally $-0.2$, optionally $-0.1$, optionally 0, optionally 0.1, optionally 0.2, or optionally 0.3. Optionally, y is greater than or equal to $-0.30$, $-0.29$, $-0.28$, $-0.27$, $-0.26$, $-0.25$, $-0.24$, $-0.23$, $-0.22$, $-0.21$, $-0.20$, $-0.19$, $-0.18$, $-0.17$, $-0.16$, $-0.15$, $-0.14$, $-0.13$, $-0.12$, $-0.11$, $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3.

It is appreciated that in some aspects Li need not be exclusively Li, but may be partially substituted with one or more elements selected from the group consisting of Mg, Sr, Na, K, and Ca. The one or more elements substituting Li, are optionally present at 10 atomic % or less, optionally 5 atomic % or less, optionally 3 atomic % or less, optionally no greater than 2 atomic percent, where percent is relative to total Li in the material.

M as provided in the first composition includes Ni. The amount of Ni in the first composition is optionally from 10 atomic percent to 100 atomic percent (at %) of total M. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 97 at %, 98 at %, 99 at %, 99.5 at %, 99.9 at %, or 100 at %.

In some aspects, M in the first composition is Ni alone or in combination with one or more additional elements. The additional elements are optionally metals. Optionally, an additional element may include or be one or more of Al, Mg, Co, Mn, Ca, Sr, Zn, Ti, Y, Cr, Mo, Fe, V, Si, Ga, or B. In particular aspects, the additional element may include Mg, Co, Al, or a combination thereof. Optionally, the additional element may be Mg, Al, V, Ti, B, or Mn, or a combination thereof. Optionally, the additional element is selected from the group consisting of Mg, Al, V, Ti, B, or Mn. Optionally, the additional element selected from the group consisting of Mg, Co, and Al. Optionally, the additional element selected from the group consisting of Ca, Co, and Al. In some aspects, the additional element is Mn or Mg, or both Mn and Mg. Optionally, the additional element is Mn, Co, Al, or any combination thereof. Optionally the additional element includes Co and Mn. Optionally the additional element is Co and Al. Optionally the additional element is Co.

An additional element of the first composition may be present in an amount of about 1 to about 90 at %, specifically about 5 to about 80 at %, more specifically about 10 to about 70 at % of M in the first composition. Optionally, the additional element may be present in an amount of about 1 to about 20 at %, specifically about 2 to about 18 at %, more specifically about 4 to about 16 at %, of M in the first composition. In some illustrative examples, M is about 75-100 at % Ni, 0-15 at % Co, 0-15 at % Mn, and 0-10 at % additional elements.

Within the polycrystalline material, each crystallite may have any suitable shape, which can be the same or different within each particle. Further, the shape of each crystallite can be the same or different in different particles. Because of its crystalline nature, the crystallite may be faceted, the crystallite may have a plurality of flat surfaces, and a shape of the crystallite may approximate a geometric shape. In some aspects, the crystallite may be fused with neighboring crystallites with mismatched crystal planes. The crystallite may optionally be a polyhedron. The crystallite may have a rectilinear shape, and when viewed in cross-section, a portion of or an entirety of the crystallite may be rectilinear. The crystallite may be square, hexagonal, rectangular, triangular, or a combination thereof.

In particular aspects, a secondary particle has a Co and Al enriched grain boundary, optionally where the atomic percentage of Co and Al in the grain boundary is higher than the atomic percentage of Co and Al in the crystallites as averaged throughout. Referring to FIG. 1 as an exemplary illustration, the grain boundary 20, 21 is between adjacent crystallites 10, and includes the second composition. A second composition may be as described in U.S. Pat. Nos. 9,391,317 and 9,209,455 with the exception that both Co and Al must independently be enriched in the grain boundary relative to the concentration of Co and Al each independently in the crystallites and, in some aspects, may provide synergistic effects in reducing impedance or improving cycle life due to the concentrations of Co and Al being within certain concentration ranges. The second composition optionally has the layered α-NaFeO$_2$-type structure, a cubic structure, or a combination thereof. As noted above, a concentration of Co and Al in the grain boundaries may be greater than a concentration of Co and Al in the crystallites. An aspect in which the grain boundaries have the layered α-NaFeO$_2$-type structure is specifically mentioned. Another aspect in which the grain boundaries with α-NaFeO$_2$-type structure with defects is specifically mentioned. Another aspect in which parts of the grain boundaries have a cubic or spinel structure is specifically mentioned.

The second composition as present in part or in whole in the grain boundaries optionally includes lithiated metal oxides defined by composition $Li_{1+x}MO_{2+y}$, where $-0.1 \le x \le 0.3$ and $-0.3 \le y \le 0.3$. Optionally a second composition and a first composition are identical with the exception of the presence of or increased concentration of Co and Al in the second composition relative to the first composition. In some aspects of the second composition, x is −0.1, optionally 0, optionally 0.1, optionally 0.2, or optionally 0.3. Optionally, x is greater than or equal to −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is −0.3, optionally −0.2, optionally −0.1, optionally 0, optionally 0.1, optionally 0.2, or optionally 0.3. Optionally, y is greater than or equal to −0.30, −0.29, −0.28, −0.27, −0.26, −0.25, −0.24, −0.23, −0.22, −0.21, −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3.

M as provided in the second composition includes Co and Al. The amount of Ni, if present, is optionally from 0.01 atomic percent to 99 atomic percent (at %) of M. Optionally, M in the second composition is free of Ni. Optionally, the amount (i.e. relative concentration) of Ni in the second composition is lower than the amount of Ni in the first composition in relative atomic percent (with respect to the respective composition in which the Ni is present). Optionally, the Ni component of M is less than or equal to 1 at %. Optionally, the Ni component of M is less than or equal to 5 at %. Optionally, the Ni component of M is less than or equal to 10 at %. Optionally, the Ni component of M is less than or equal to 20 at %. Optionally, the Ni component of M is less than or equal to 75 at %. Optionally, the Ni component of M is less than or equal to 80 at %. Optionally, the Ni component of M is less than or equal to 85 at %. Optionally, the Ni component of M is less than or equal to 90 at %. Optionally, the Ni component of M is less than or equal to 95 at %. Optionally, the Ni component of M is less than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 97 at %, 98 at %, 99 at %, or 99.9 at %.

For the materials optionally as provided herein, the nominal or overall formulated composition of the secondary particles (for example, characterized by Inductively Coupled Plasma (ICP)), optionally the first composition, or optionally the second composition, is defined by the formula LiMO, wherein M is Ni and optionally one or more additional metals that in the second composition must include at least Co and Al. The mole fraction of Co and Al in the first composition, if present, as defines the composition of the crystallites is lower than the mole fraction of the total Co and Al independently or combined in the total particle composition as determined by ICP. The mole fraction of Co and Al independently or combined in the first composition can be zero. The mole fraction of Co and Al in the second composition independently or combined as defines the grain boundary is higher than the mole fraction of Co and Al independently or combined in the total particle as measured by ICP.

A second composition located within the grain boundaries includes Co and Al, optionally with the condition that the concentration of Co and Al independently or combined in the grain boundary is greater than the concentration of Co and Al independently or combined in the crystallites, optionally where the concentration of Co in the grain boundary is greater than the concentration of Co in the crystallites, and optionally where the concentration of Al in the grain boundary is greater than the concentration of Al in the crystallites. It was found that using processes that are capable of enriching Co and Al in the grain boundaries, liquid solutions that included amounts relative to the total transition metal of the first composition to be enriched of Co of at or between 0 at % and 8 at %, optionally at or between 3 at % and 5 at % Co could be supplemented with 0.01 at % to 10 at % Al, optionally 1.5 at % or less Al, and create materials that showed significantly reduced impedance growth during cycling, where the added Co and Al are incorporated into the grain boundaries of the secondary particle.

The volume fraction of grain boundaries within a given secondary particle will vary because the primary particle size distribution varies with variations in overall composition and synthetic conditions, and accordingly, the final concentration of Co and Al in the second composition can vary between different secondary particles and within individual secondary particles as well, while still always being greater than the concentrations of Co and Al in the first composition. It is thus most useful that the amount of Co and Al added to the grain boundary be defined relative to the first composition.

The provided amounts of Co and Al in the process solution are considered average amounts of Co and Al added to the secondary particles and distributed in the grain boundaries of the entire secondary particle and are presented relative to M of the first composition. When making the secondary particles as described herein it was found that virtually all of the Co and Al in the process solution was adhered to the particles prior to calcination. As such, the amount of Co and Al available for enriching the grain boundaries is the amount in the process solution. Therefore, when describing a process solution that is, for example, 1 at % Al and 2 at % Co, this listed at % is relative to the amount of M in the first composition prior to grain boundary enrichment. As such, the at % of Al and Co in the process solution as used herein is always relative to total M in the primary particles to be grain boundary enriched.

The amount of Al in the process solution is optionally 0.01 at % to 10 at %, optionally 9 at % or less, optionally 8 at % or less, optionally 7 at % or less, optionally 6 at % or less, optionally 5 at % or less, optionally 4 at % or less, optionally 3 at % or less, optionally 2 at % or less, optionally 1 at % or less, optionally 0.1 to 1 at %, optionally 0.5 to 1 at %. Optionally, the amount of Al in the process solution is at or less than an atomic percentage of 0.1, 0.2, 0.3, 0.4, 0.5, 0.6, 0.7, 0.8, 0.9, 1.0, 1.1, 1.2, 1.3, 1.4, or 1.5.

Optionally, the amount of Co in the process solution is greater than 3 at % and up to 4 at %, and the amount of Al is less than 1 at %, optionally from 0.1 to 1 at %, optionally 0.1 to less than 1 at %. Optionally, the amount of Co in the process solution is 0.5 at % to 4 at %, and the amount of Al is 0.01 at % to 10 at %.

In some aspects the amount of Co in the process liquid is about 3 at %. At this concentration of Co, the amount of Al is optionally less than 1 at %. Amounts of Al of about 0.3 at % to 0.7 at %, optionally about 0.5 at % are optimal for reducing impedance growth during cycling. Optionally, the Al is distributed substantially uniformly among the plurality of the secondary particles.

In some aspects the amount of Co in the process liquid is about 3.5 at %. At this amount of Co, the amount of Al is optionally less than 1 at %. Amounts of Al of about 0.3 to 0.7 at %, optionally about 0.5 at % are optimal for reducing impedance growth during cycling. Optionally, the Al is distributed substantially uniformly among the plurality of the secondary particles.

In some aspects the amount of Co in the process liquid is about 4 at %. At this concentration of Co, the amount of Al is optionally less than 1.5 at %. Amounts of Al of about 0.7 to 1.3 at %, optionally about 1.0 at % are optimal for reducing impedance growth during cycling. Optionally, the Al is distributed substantially uniformly among the plurality of the secondary particles.

In some aspects the amount of Co in the process liquid is about 4.5 at %. At this concentration of Co, the amount of Al is optionally less than 1 at %. Amounts of Al of about 0.3 to 0.7, optionally about 0.5 at % are optimal for reducing impedance growth during cycling. Optionally, the Al is distributed substantially uniformly among the plurality of the secondary particles.

In some aspects the amount of Co in the process liquid is about 3 at %. At this concentration of Co, the amount of Al is optionally less than 1.5 at %. Amounts of Al of about 0.5 to 1.3 at %, optionally about 1.0 at % are optimal for reducing impedance growth during cycling. Optionally, the Al is distributed substantially uniformly among the plurality of the secondary particles.

In some aspects the amount of Co in the process liquid is about 3 at % to about 4 at %. At this concentration of Co, the amount of Al is optionally less than 1 at %. Amounts of Al of about 0.3 to 0.1.3, optionally about 0.5 at % or about 1.0 at % are optimal for reducing impedance growth during cycling. Optionally, the Al is distributed substantially uniformly among the plurality of the secondary particles.

In some aspects the amount of Co in the process liquid is about 3 at %. At this concentration of Co, the amount of Al is optionally less than 1.5 at %. Amounts of Al of about 0.5 to 1.3 at % are optimal for reducing impedance growth during cycling. Optionally, the Al is distributed substantially uniformly among the plurality of the secondary particles.

In some aspects the amount of Co in the process liquid is about 4 at %. At this concentration of Co, the amount of Al is optionally less than 1.0 at %. Amounts of Al of about 0.5 to 0.7 at % are optimal for reducing impedance growth during cycling. Optionally, the Al is distributed substantially uniformly among the plurality of the secondary particles.

As such, in some aspects, as the amount of Co increased from 3 at % to 4 at %, the amount of Al that produces the most improved results moves from less than 1.3 at % to less than 0.7 at %. Optionally, the Al is distributed substantially uniformly among the plurality of the secondary particles.

Optionally, as exhibited by some aspects of the secondary particles described herein, the amount of Al relative to the amount of Co in the second composition is equal to or less than 100 at % meaning that the amount of Al is optionally equal to or less than the amount of Co. Optionally, the amount of Al relative to Co is less than 90 at %, optionally less than 80 at %, optionally less than 70 at %, optionally less than 60 at %, optionally less than 50 at %, optionally less than 40 at %, optionally less than 30 at %, optionally less than 20 at %, optionally less than 10 at %, optionally less than 9 at %, optionally less than 8 at %, optionally less than 7 at %, optionally less than 6 at %, optionally less than 4 at %, optionally less than 3 at %, optionally less than 2 at %, optionally less than 1 at %. It was found that the amount of Co being greater than the amount of Al allows for a synergistic relationship that unexpectedly reduces impedance growth relative to Co alone at the same or greater concentrations.

Optionally, the Al present in the second composition or throughout a portion or the whole of the grain boundaries among the plurality of the secondary particles is substantially uniform. For example, when Al is introduced by the methods provided herein for Al-only grain boundary enrichment, the result as observed by EDS of the powder by standard techniques is the presence of "hotspots" rich in Al illustrating uneven or inefficient uptake of Al into the grain boundaries resulting in separate phases of Al. However, in the presence of Co and Al at the concentrations as described herein in the process solution, the result is a much more uniform distribution of Al illustrating the near or total absence of observed hotspots by EDS. In some aspects, the number and/or size of hotspots of Al is reduced by 50% or more, optionally 60% or more, optionally 70% or more, optionally 80% or more, relative to that occurring with Al grain boundary enrichment in the absence of Co co-enrichment.

Aluminum uniformity can also be assessed by comparing the EDS at two magnifications. Table 2 of Example 1 shows aluminum concentration by EDS for a wide area (around 150 µm×150 µm) as the first number in the table followed by a second number which is average EDS analyses of much narrower areas (approximately 1 µm×1 µm) centered on particles with no apparent hotspots. When 4% cobalt is used in the process liquid, these two numbers are close together. However, when cobalt is not used, the non-hotspot narrow areas have much less aluminum compared to the wider area, showing that much more aluminum is centered in hotspots rather than being uniformly distributed among the plurality of secondary particles.

In some aspects, M in a second composition further includes one or more Ni substituting elements (substitution element). The Ni-substituting elements are optionally metals and are not Co or Al as the presence of these elements results in the observed synergistic reductions in impedance growth. Optionally, a substituting element may include or be one or more of Mg, Mn, Ca, Sr, Zn, Ti, Zr, Hf, Y, Cr, Mo, W, Fe, V, Nb, Ta, Si, Ga, or B. A substitution element of the second composition may be present in an amount of about 1 to about 90 at %, specifically about 5 to about 80 at %, more specifically about 10 to about 70 at % of the first composition. Optionally, the additional element may be present in an amount of about 1 to about 20 at %, specifically about 2 to about 18 at %, more specifically about 4 to about 16 at %, of the first composition.

Optionally, Li in the second composition need not be exclusively Li, but may be partially substituted with one or more Li-substitution elements selected from the group consisting of Mg, Sr, Na, K, and Ca. The one or more Li-substitution elements, are optionally present at 10 atomic % or less, optionally 5 atomic % or less, optionally 3 atomic % or less, optionally no greater than 2 atomic percent, where percent is relative to total Li in the as-made material.

The secondary particles as provided herein may be prepared by synthesizing a green body from at least two components, optionally in powder form. At least two components may include micronized (or non-micronized) lithium hydroxide or its hydrate and a precursor hydroxide(s) comprising nickel, and optionally one or more other elements, and where the precursor hydroxides are optionally obtained by co-precipitation processes. It is appreciated that the final overall composition (although not necessarily distribution) of the elements in the final particle may be adjusted by increasing or decreasing the relative amounts of the precursor materials in the formation of the green body. In some aspects, the lithium hydroxide or its hydrate are micronized. The two or more powders forming the green body may be combined and shaken on a paint shaker to thoroughly mix the precursors. The green body is then calcined with a controlled air or pure oxygen atmosphere to a maximum temperature. Calcining is optionally preformed following a heating curve. The calcined product may then be processed to form a free-flowing powder.

In some aspects, the precursor hydroxide may be a mixed metal hydroxide. In some aspects, the mixed metal hydroxide may include a metal composition of Ni, Co, and Mg. Optionally, the mixed metal hydroxide includes as a metal component 10-100 at % Ni, 0-15 at % Co, and 0-5 at % Mg. Optionally the mixed metal hydroxide includes Ni from 10-100 at %, Co in the range of 0-30 at %, and Mn in the range of 0.1-80 at %. Optionally the mixed metal hydroxide includes Ni from 10-100 at %, Co in the range of 0-30 at %, and Al in the range of 0-10 at %. Optionally, the metals of the mixed metal hydroxide is 92 at % Ni and 8 at % Co. Optionally, the metals of the mixed metal hydroxide is 90 at % Ni, 8 at % Co, and 2 at % Mg. Optionally, the metals of the mixed metal hydroxide is 89 at % Ni, 8 at % Co, 3 at % Mg. Optionally, the metals of the mixed metal hydroxide is 91 at % Ni, 8 at % Co, and 1 at % Mg. Optionally, the metal of the mixed metal hydroxide is 100 at % Ni. For example, precursor hydroxide may be made by a precursor supplier, such as Hunan Brunp Recycling Technology Co. Ltd., using standard methods for preparing nickel-hydroxide based materials.

A secondary particle may be formed by a multi-step process whereby a first material particle is formed and calcined so as to establish the formation of defined grain boundaries optionally with the primary particles having α-NaFeO$_2$ structure with few defects. The particles are then subject to a liquid process that applies Co and Al at the desired concentration levels followed by drying and then a second calcination so as to move the Co and Al precipitated species at the surface selectively into the grain boundaries to thereby form the secondary particle having a concentration of Co and Al in the grain boundaries that is higher than in the crystallites. According to methods of manufacturing a secondary particle that has a base of Ni, Co, and Mg as provided herein as an example, formation may include: combining a lithium compound, and a hydroxide precursor compound of one or more metals or metalloids (e.g. Ni, Co, and Mg combined as previously generated such as by a co-precipitation reaction) to form a mixture; heat treating the mixture at about 30 to about 200° C. to form a dried mixture; heat treating the dried mixture at about 200 to about 500° C. for about 0.1 to about 5 hours; then heat treating at 600° C. to less than about 800° C. for about 0.1 to about 10 hours to manufacture the secondary particle. A first calcination maximum temperature is relative and specific to the material used in the hydroxide precursor. Optionally, in a first calcination, a maximum temperature may be at or less than 850 degrees Celsius, optionally at or less than 720 degrees Celsius, optionally at or less than 715 degrees Celsius, optionally at or less than 710 degrees Celsius, optionally at or less than 705 degrees Celsius, optionally at or less than 700 degrees Celsius. Optionally, the maximum temperature of the first calcination may be about 680 degrees Celsius or less. Optionally, the maximum temperature may be about 660 degrees Celsius or less. Optionally, the maximum temperature may be about 640 degrees Celsius or less. In yet other aspects, the maximum temperature may be less than about 700 degrees Celsius, about 695 degrees Celsius, about 690 degrees Celsius, about 685 degrees Celsius, about 680 degrees Celsius, about 675 degrees Celsius, about 670 degrees Celsius, about 665 degree Celsius, about 660 degrees Celsius, about 655 degrees Celsius, about 650 degrees Celsius, about 645 degrees Celsius, or about 640 degrees Celsius. The dwell time at the maximum temperature is optionally less than 10 hours. Optionally, the dwell time at the maximum temperature is less than or equal to 8 hours; optionally less than or equal to 7 hours; optionally less than or equal to 6 hours; optionally less than or equal to 5 hours; optionally less than or equal to 4 hours; optionally less than or equal to 3 hours; optionally less than or equal to 2 hours.

After calcination, subsequent processing may include breaking up the calcined material with a mortar and pestle so that the resulting powder passes through a desired sieve, optionally a #35 sieve. The powder is optionally then jar milled in a 1 gallon jar with a 2 cm drum YSZ media for optionally 5 minutes or an adequate time such that the material may pass through optionally a #270 sieve.

The product of the first calcination or milled product may be subsequently processed, optionally in a method so as to result in enriched grain boundaries following a second calcination. A process to enrich grain boundaries within a primary particle may be performed by methods or using compositions as illustrated in U.S. Pat. Nos. 9,391,317 and 9,209,455 with the exception that the application process uses a liquid solution that includes a level of Co and a level of Al, optionally whereby the level is such to produce a synergistic enrichment of Co and Al in the grain boundaries of the secondary particle. The grain-boundary-enriching elements may optionally be applied by suspending the milled product in an aqueous slurry comprising Co, Al, and a lithium compound optionally at a temperature of about 60 degrees Celsius whereby the Co and Al are present in the aqueous solution at the concentrations as described herein. The slurry may then be spray dried to form a free-flowing powder which is then subjected to a second calcination optionally with a heating curve following a two ramp/dwell process. The first two ramp/dwell temperature profile may be from ambient (about 25 degree Celsius) to 450 degrees Celsius and optionally at a rate of 5 degree Celsius per minute with a 1 hour hold at 450 degrees Celsius. Subsequently, the second ramp/dwell may be from 450 degrees Celsius to a maximum temperature at a rate of 2 degree Celsius per minute with a 2 hour hold at the maximum temperature. In some aspects, the maximum temperature is less than about 725 degrees Celsius, optionally at or about 700 degrees Celsius. In other aspects, the maximum temperature is about 725 degrees Celsius, optionally 750 degrees Celsius.

By combining a first calcination with a maximum temperature as described above with a process to apply grain-boundary-enriching elements followed by a second calcination also as described above, it was found that the resulting particles could be used in a cathode so as to produce significantly improved reductions in impedance growth and/or capacity fade. Such a combination was found to result in additional cycle life and reduction in impedance growth, significantly improving the electrochemical performance of the material. As such, it is appreciated that in some aspects, a particle includes a plurality of crystallites with a first composition including polycrystalline layered-structure lithiated metal oxides defined by composition $Li_{1+x}MO_{2+y}$ where $-0.1 \leq x \leq 0.3$ and $-0.3 \leq y \leq 0.3$. In some aspects x is $-0.1$, optionally 0, optionally 0.1, optionally 0.2, or optionally 0.3. Optionally x is greater than or equal to $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is $-0.3$, optionally $-0.2$, optionally $-0.1$, optionally 0, optionally 0.1, optionally 0.2, or optionally 0.3. Optionally, y is greater than or equal to $-0.30$, $-0.29$, $-0.28$, $-0.27$, $-0.26$, $-0.25$, $-0.24$, $-0.23$, $-0.22$, $-0.21$, $-0.20$, $-0.19$, $-0.18$, $-0.17$, $-0.16$, $-0.15$, $-0.14$, $-0.13$, $-0.12$, $-0.11$, $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3. The crystallites have an amount of Ni of 10 atomic percent to 100 atomic percent (at %) of the M element. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 98 at %, 99 at % or 100 at %. The M component may include one or more additional elements. The additional elements are optionally metals. Optionally, an additional element may include or be one or more of Al, Mg, Co, Mn, Ca, Sr, Zn, Ti, Y, Cr, Mo, Fe, V, Si, Ga, or B. In particular aspects, the additional element may include Mg, Co, Al, or a combination thereof. Optionally, the additional element may be Mg, Al, V, Ti, B, or Mn, or a combination thereof. Optionally, the additional element consists of Mg, Al, V, Ti, B, or Mn. In some aspects, the additional element is Mn or Mg, or both Mn and Mg. The additional element of the first composition may be present in an amount of about 1 to about 90 at %, specifically about 5 to about 80 at %, more specifically about 10 to about 70 at % of the first composition. Optionally, the additional element may be present in an amount of about 1 to about 20 at %, specifically about 2 to about 18 at %, more specifically about 4 to about 16 at %, of the first composition. In some illustrative examples, M is about 75-100 at % Ni, 0-15 at % Co, 0-15 at % Mn, and 0-10 at % additional elements. The resulting secondary particles have grain boundaries whereby the amount of Co and the amount of Al are greater than in the crystallites.

The resulting particles optionally demonstrate reductions in impedance growth relative to particles with Co enriched grain boundaries alone, optionally at levels of Co that were thought to be insufficient to significantly improve cycling characteristics of particles without Co enrichment in the grain boundaries. When the resulting secondary particles are the active material of Li-ion cell cathodes, the cells cycled between 4.2V and 2.7V at 45° C. optionally exhibit impedance growth in the fully charged (4.2V) state of less than 50% for greater than 50 cycles, optionally greater than 60 cycles, optionally greater than 70 cycles, optionally greater than 80 cycles, optionally greater than 90 cycles, optionally greater than 100 cycles, optionally greater than 110 cycles, optionally greater than 120 cycles, optionally greater than 130 cycles, optionally greater than 140 cycles, optionally greater than 150 cycles, optionally greater than 200 cycles.

In other aspects, the cells cycled between 4.2V and 2.7V at 45° C. optionally exhibit impedance growth in the fully charged (4.2V) state of less than 100% for greater than 100 cycles, optionally greater than 110 cycles, optionally greater than 120 cycles, optionally greater than 130 cycles, optionally greater than 140 cycles, optionally greater than 150 cycles, optionally greater than 160 cycles, optionally greater than 170 cycles, optionally greater than 180 cycles, optionally greater than 190 cycles, optionally greater than 200 cycles, optionally greater than 210 cycles, optionally greater than 220 cycles.

In other aspects, the cells cycled between 4.2V and 2.7V at 45° C. optionally exhibit impedance growth at 50% state of charge (SOC) of less than 50% for greater than 200 cycles, optionally of less than 40% for greater than 200 cycles, optionally of less than 30% for greater than 200 cycles.

An electrochemical cell as provided herein optionally uses as an electrochemically active material particles as provided herein optionally having an initial discharge capacity of 180 mAh/g of the particles or greater, optionally 185 mAh/g, optionally 190 mAh/g, optionally 195 mAh/g, optionally 200 mAh/g, optionally 210 mAh/g.

As shown in FIG. 1, disclosed is a particle comprising a crystallite 10 comprising a first composition, and grain boundaries 20, 21 comprising a second composition, wherein a concentration of Al in the grain boundary is greater than a concentration of Al in the crystallites and a concentration of cobalt in the grain boundary is greater than a concentration of cobalt in the crystallite. The particle comprises a plurality of crystallites, and is referred to as a secondary particle. Optionally an outer layer illustrated at 30 in FIG. 1, such as a passivation layer or a protective layer, may be deposited on an outer surface of the particle. The outer layer may fully or partially cover the secondary particle. The layer may be amorphous or crystalline. The layer may comprise an oxide, a phosphate, a pyrophosphate, a fluorophosphate, a carbonate, a fluoride, an oxyfluoride, or a combination thereof, of an element such as Al, Ti, B, Li, or Si, or a combination thereof. In some aspects the outer layer comprises a borate, an aluminate, a silicate, a fluoroaluminate, or a combination thereof. Optionally, the outer layer comprises a carbonate. Optionally, the outer layer comprises $ZrO_2$, $Al_2O_3$, $TiO_2$, $AlPO_4$, $AlF_3$, $B_2O_3$, $SiO_2$, $Li_2O$, $Li_2CO_3$, or a combination thereof. Optionally, an outer layer includes or is $AlPO_4$ or $Li_2CO_3$. The layer may be deposited disposed by any process or technique that does not adversely affect the desirable properties of the particle. Representative methods include spray coating and immersion coating, for example.

Also provided are electrodes that include as a component of or the sole electrochemically active material a secondary particle as described herein. A secondary particle as provided herein is optionally included as an active component of a cathode. A cathode optionally includes a secondary particle disclosed above as an active material, and may further include a conductive agent and/or a binder. The conductive agent may comprise any conductive agent that provides suitable properties and may be amorphous, crystalline, or a combination thereof. The conductive agent may include a carbon black, such as acetylene black or lamp black, a mesocarbon, graphite, graphene, carbon fiber, carbon nanotubes such as single wall carbon nanotubes or multi-wall carbon nanotubes, or a combination thereof. The binder may be any binder that provides suitable properties and may include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured by combining the particle as described herein, the conductive agent, and the binder in a suitable ratio, e.g., about 80 to about 98 weight percent of the particle, about 1 to about 20 weight percent of the conductive agent, and about 1 to about 10 weight percent of the binder, based on a total weight of the particle, the conductive agent, and the binder combined. The particle, the conductive agent, and the binder may be suspended in a suitable solvent, such as N-methylpyrrolidinone, and disposed on a suitable substrate, such as aluminum foil, and dried in air. It is noted that the substrate and the solvent are presented for illustrative purposes alone. Other suitable substrates and solvents may be used or combined to form a cathode.

A cathode as provided herein when cycled with a MCMB 10-28 graphite anode, a polyolefin separator and an electrolyte of 1 M $LiPF_6$ in 1/1/1 (vol.) EC/DMC/EMC with 1 wt. % VC in a 2025 coin cell optionally demonstrates a significantly reduced impedance growth relative to materials with Co enrichment alone or no grain boundary enrichment. One measure of impedance growth may be obtained by high-rate cycling of the cell, with a 1C/1C charge/discharge cycle interspersed in the cycling regime at 20 cycle intervals. The 1C charge to 4.2V is followed by a voltage hold during which the cell voltage is maintained at 4.2V until the current decays to C/10 rate, and then the cell is allowed to rest at open circuit for 5 minutes. When the fully charged cell is then discharged, the voltage drop it undergoes in the first 10 seconds of discharge and the 1C discharge rate are plugged into Ohm's law (V=IR) to calculate a DCR (direct current resistance) measurement of cell impedance. The impedance measurement plotted against cycle number results in a curve with a defined slope. The impedance slope is lower when active particle material has grain boundaries enriched with Co and Al as described herein relative to particles without such enrichment of grain boundaries or relative to particles having grain boundaries enriched only with Co. In some aspects, the impedance growth of cells is at or less than 25% for the first 50 cycles, optionally 50% or less over the first 100 cycles, optionally 63% or less over the first 125 cycles, optionally 75% or less over the first 150 cycles. Optionally, the impedance growth is at or less than 25% over 50 cycles, optionally 50% or less over 100 cycles, optionally 63% or less over 125 cycles, optionally 75% or less the first 150 cycles.

Also disclosed is a battery comprising the cathode. The battery may be a lithium-ion battery, a lithium-polymer battery, or a lithium battery, for example. The battery may include a cathode, an anode, and a separator interposed between the cathode and the anode. The separator may be a microporous membrane, and may include a porous film including polypropylene, polyethylene, or a combination thereof, or may be a woven or non-woven material such a glass-fiber mat. The anode may include a coating on a current collector. The coating may include a suitable carbon, such as graphite, coke, a hard carbon, or a mesocarbon such as a mesocarbon microbead, for example. The current collector may be copper foil, for example.

The battery also includes an electrolyte that may contact the positive electrode (cathode), the negative electrode (anode), and the separator. The electrolyte may include an organic solvent and a lithium salt. The organic solvent may be a linear or cyclic carbonate. Representative organic solvents include ethylene carbonate, propylene carbonate, butylene carbonate, trifluoropropylene carbonate, γ-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, propane sultone, or a combination thereof. In another aspect the electrolyte is a polymer electrolyte.

Representative lithium salts useful in an electrolyte include but are not limited to $LiPF_6$, $LiBF_4$, $LiAsF_6$, $LiClO_4$, LiCF$_3$SO$_3$, Li(CF$_3$SO$_2$)$_2$N, LiN(SO$_2$C$_2$F$_5$)$_2$, LiSbF$_6$, LiC(CF$_3$SO$_2$)$_3$, LiC$_4$F$_9$SO$_3$, and LiAlCl$_4$. The lithium salt may be dissolved in the organic solvent. A combination comprising at least one of the foregoing can be used. The concentration of the lithium salt can be 0.1 to 2.0M in the electrolyte.

The electrolyte may be a solid ceramic electrolyte.

The battery may have any suitable configuration or shape, and may be cylindrical or prismatic.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1: Polycrystalline 2D α-NaFeO$_2$-Type Layered Structure Particles with Grain Boundary Enrichment with Al and Co Electrochemically active polycrystalline 2D α-NaFeO$_2$-type layered structure particles with or without differing types of grain boundary enrichment and each with high nickel in the cathode material were prepared.

A material having the composition Li$_{1.03}$Mg$_{0.01}$Ni$_{0.92}$Co$_{0.08}$O$_2$ was prepared dry mixing 252.1 g Li(OH)$_2$ (dehydrated, micronized LiOH*H$_2$O from FMC) 961.6 Ni$_{0.91}$Co$_{0.08}$Mg$_{0.01}$OH)$_2$ (custom made) in a 1 liter jar. The compounds were mixed by shaking a jar in a paint shaker.

The mixed compounds were placed in an alumina crucible and sintered. Sintering was performed by heating at a rate of about 5° C. per minute to about 450° C., and held at about 450° C. for about two hours. The temperature was then raised at about 2° C. per minute to about 700° C., and held for about six hours. The sample was then allowed to cool naturally to room temperature. The cooled sample was ground for about five minutes to break up any agglomerates to provide Li$_{1.03}$Mg$_{0.01}$Ni$_{0.92}$Co$_{0.08}$O$_2$. The material was analyzed by XRD demonstrating an α-NaFeO$_2$-type structure.

Samples of Co and Al grain boundary enriched secondary particles of 100 g each were prepared with the above base material. Li, Co and Al nitrate salts were dissolved in 100 g of H$_2$O heated to 60° C. The amounts of Al and Co added were such to correspond to 1.9 at % and 4 at %, respectively, relative to Ni+Co in the Li$_{1.03}$Mg$_{0.01}$Ni$_{0.92}$Co$_{0.08}$O$_2$ first composition. The amount of LiNO$_3$ formulated were such that the final Li to transition metal+Al ratio was 1.01.

100 g of the Li$_{1.03}$Mg$_{0.01}$Ni$_{0.92}$Co$_{0.08}$O$_2$ of as produced above was added thereto and the resulting slurry was stirred for 30 to 120 minutes. The slurry was then spray-dried to yield a powder. The resulting powder was placed in an alumina crucible and heated at a rate of about 5° C. per minute to about 450° C., and held at about 450° C. for about one hour. The temperature was then raised at about 2° C. per minute to about 700° C., and held for about two hours. Each material was then permitted to naturally cool to 100° C. The calcined materials were first individually ground in a mortar and pestle and then milled in a jar mill.

Overall, four materials grain-boundary-enriched with or without Al and/or Co were prepared using the procedures as described above with the final overall compositions shown in Table 1 based on their synthetic formulations.

TABLE 1

| Material Description | Overall Final Particle Composition | Addition to Process Liquid | |
|---|---|---|---|
| | | Co (at %) | Al (at %) |
| No Grain-Boundary Enriching Process[1] | Li$_{1.03}$Mg$_{0.01}$Ni$_{0.92}$Co$_{0.08}$O$_2$ | 0.0 | 0.0 |
| No Grain-Boundary Enriching Elements[2] | Li$_{1.03}$Mg$_{0.01}$Ni$_{0.92}$Co$_{0.08}$O$_2$ | 0.0 | 0.0 |
| Cobalt Only | Li$_{0.01}$Mg$_{0.01}$Ni$_{0.88}$Co$_{0.12}$O$_2$ | 4.0 | 0.0 |
| Aluminum Only | Li$_{1.01}$Mg$_{0.01}$Ni$_{0.90}$Co$_{0.078}$Al$_{0.019}$O$_2$ | 0.0 | 1.9 |
| Cobalt and Aluminum | Li$_{1.01}$Mg$_{0.01}$Ni$_{0.86}$Co$_{0.11}$Al$_{0.019}$O$_2$ | 4.0 | 1.9 |

[1] control - no treatment and no contact with processing liquid
[2] control - spray dry and calcination only no elements added to process liquid The resulting materials as well as a control were each blended with PVDF binder and conductive carbon in a slurry of NMP solvent and coated onto an aluminum foil current collector. Similar coatings of selected materials were also prepared on Cu foil so that they could be analyzed for Al distribution by FIB-STEM-EDS without risk of measuring Al originating from the foil. Cathode electrodes were then punched out of the foil and combined with MCMB 10-28 graphite anodes, porous polypropylene separators and carbonate-based electrolytes in a Li-ion "full" coin cell format for electrochemical cycle life testing. The cathode electrodes were also combined with lithium metal anodes, porous polypropylene separators and carbonate-based electrolytes in a "half" coin cell format for electrochemical discharge capacity testing.

The full cells were cycled through a series of charge and rapid discharge cycles at 45° C. A low rate discharge capacity and the impedance value were measured every 20 charge/discharge cycles. Some of the materials were further analyzed by EDS as well as cross-section TEM/EDX prior to use in cathode formation.

Figure 2:
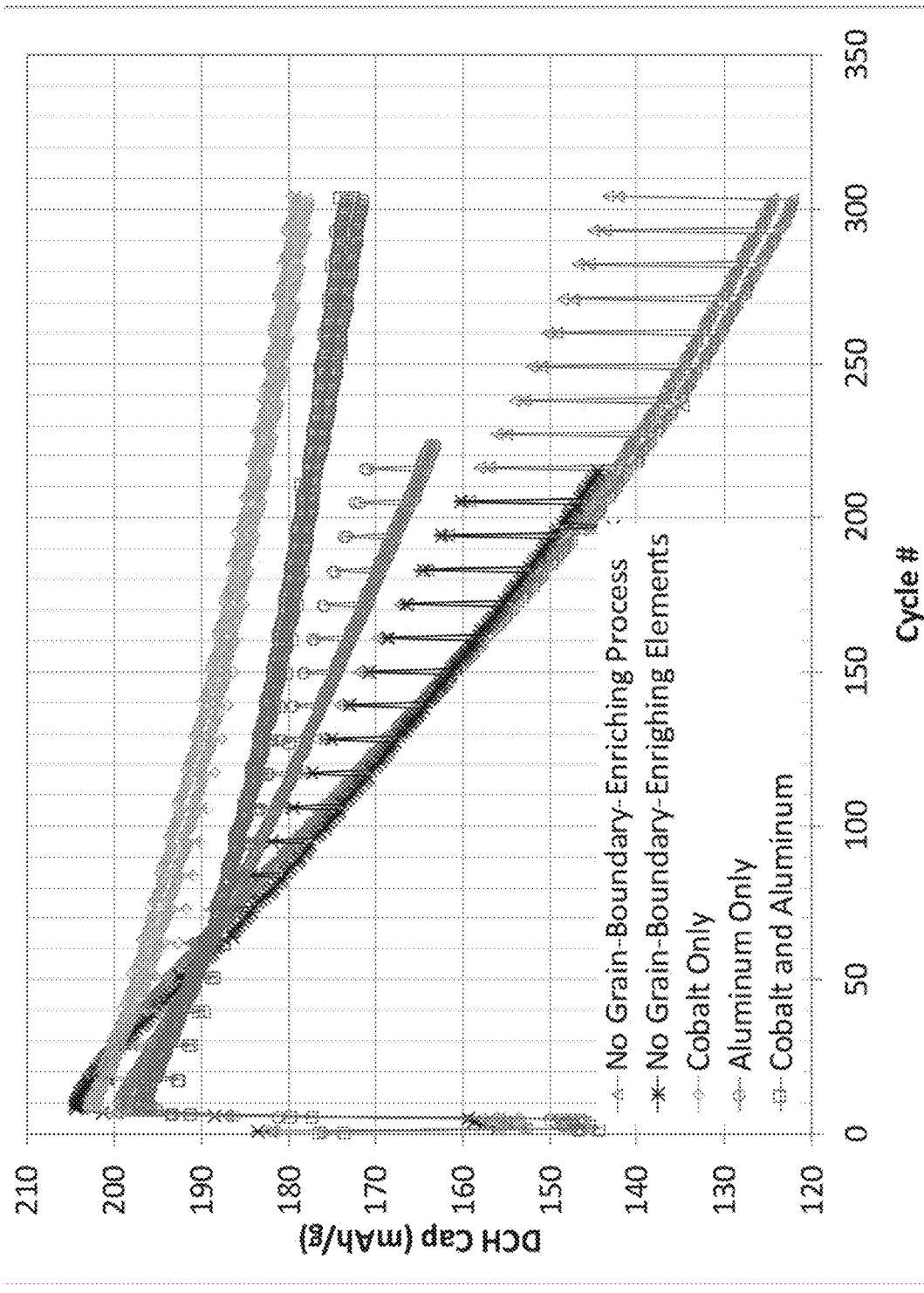
FIG. 2 illustrates capacity fade for full cells employing secondary particles according to some aspects as provided herein.
Figure 3:
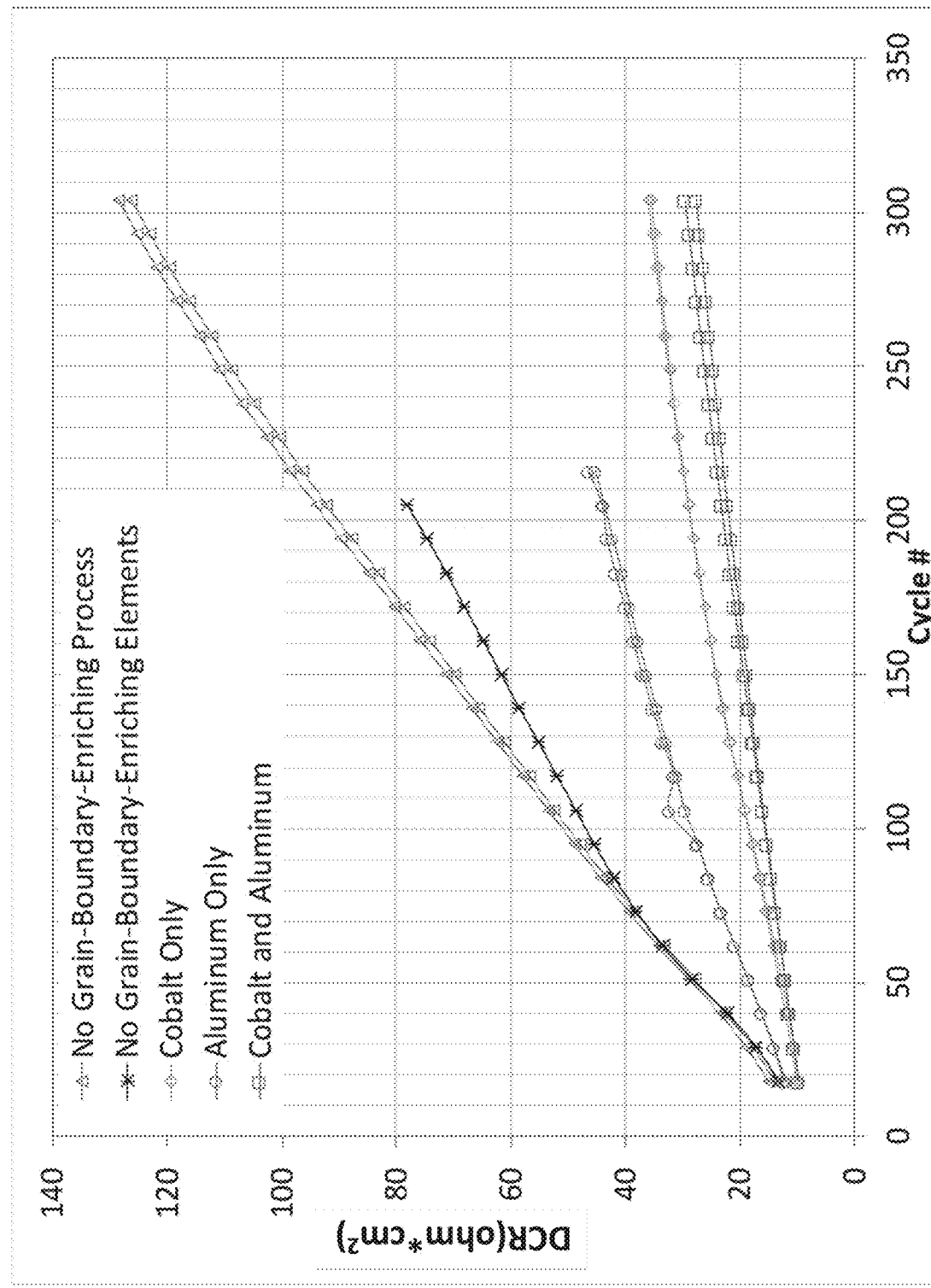
FIG. 3 illustrates impedance growth for full cells employing secondary particles according to some aspects as provided herein.

FIGS. 2 and 3 show the capacity fade for full cells cycling at 45° C. and the associated impedance growth. FIG. 2 shows that the "No Grain-Boundary-Enriching Process" (no slurry, spray dry, or 2$^{nd}$ calcination) and "No Grain-Boundary-Enriching Elements" (no Co or Al solutes in aqueous slurry, spray dry, and 2$^{nd}$ calcination) samples had capacity fade at roughly the same high rate. The "No Grain-Boundary-Enriching Elements" material was run through the aqueous slurry and subsequent calcination process but with only water devoid of grain-boundary-enriching elements. FIG. 3 shows that the 2 materials also had similar rates of impedance increase, demonstrating that the aqueous immersion, spray drying and second calcination process had no significant impact. The aluminum-only sample showed a modest improvement over the no-grain-boundary-enriching elements-baseline but the most significant improvement was observed for the cobalt-only grain-boundary enrichment with 10% fade in 300 cycles.

The sample grain boundary (GB) enriched with both cobalt and aluminum sample did not show improvement in capacity fade over the cobalt-only. However, it did have significantly lower impedance growth as seen in FIG. 3, having about 50% growth of impedance at full state of charge after 100 cycles, and about 115% impedance growth after 200 cycles. The material GB-enriched with both Co and Al provided 30% lower impedance growth than the material GB-enriched only with Co, and did so without using any additional Co.

Figure 4:
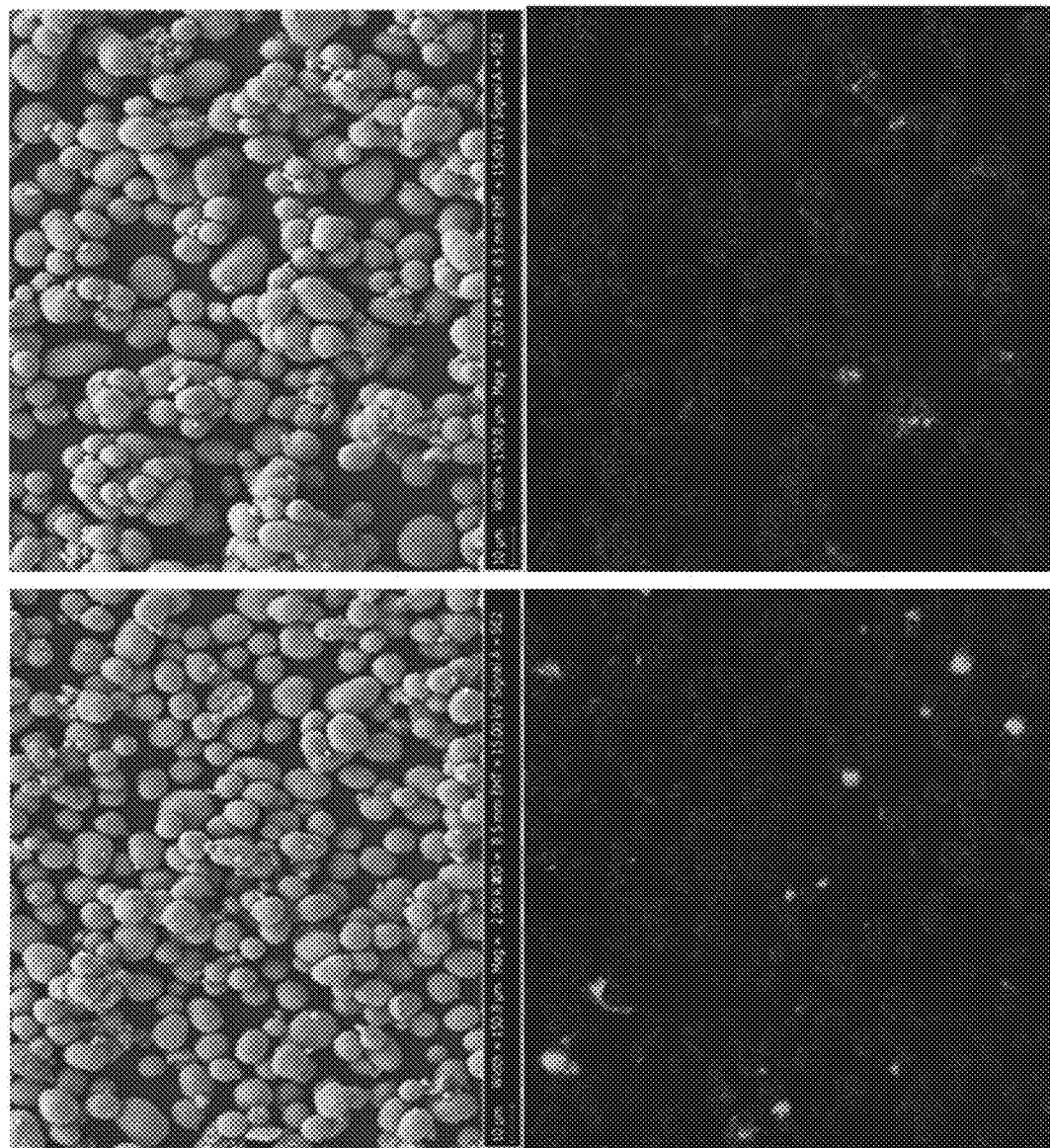
FIG. 4 illustrates EDS mapping of secondary particles as provided herein grain boundary enriched with Al only or Al in the presence of Co.

Cobalt greatly improves the uptake of the aluminum as, without the presence of Co in the process solution, separate phases of lithiated alumina are observed as indicated by EDS mapping of the calcined materials and illustrated in FIG. 4. The images below of elemental maps by EDS for Al (bright spots) show that the material formulated only with Al in the process solution had more intense and more numerous "hotspots" of Al than the material formulated with Co together with Al in the process solution, indicating that adding Co to the process formulation caused more uniform distribution of Al among the plurality of the secondary particles, and suggesting that the Co caused much more Al to be taken up by the particles when they were calcined.

The more uniform distribution and uptake of Al among the plurality of the secondary particles when it was formulated together with Co in the process solution was also shown by comparing the quantitative EDS results for Al analysis of the particles over a large area (about 150 µm×150 µm) to those obtained by averaging 3 spot (about 1 µm×1 µm) analyses obtained at non-hotspot locations. Table 2 shows these comparisons for the Al-only-formulated and the Al- and Co-formulated cathode particles, and shows that the localized non-hotspot analyses formulated with Co and Al yielded Al content results similar to those obtained over a broad area, indicating that the Al was substantially uniformly distributed among the plurality of the secondary particles. In contrast, the Al-only formulated material had much lower non-hotspot Al analysis results than the broad area did, indicating that much of the Al was concentrated in hotspot particles rather than being uniformly distributed among the plurality of the secondary particles.

TABLE 2

Results for EDS analyses of cathode material powders.

| | Al/(Co + Ni) Atom Ratio | |
| --- | --- | --- |
| Process Liquid | Broad Area | Non-Hotspot Area |
| 1.9% Al, no Co | 0.024 | 0.014 |
| 1.9% Al, 4% Co | 0.022 | 0.021 |

Figure 5:
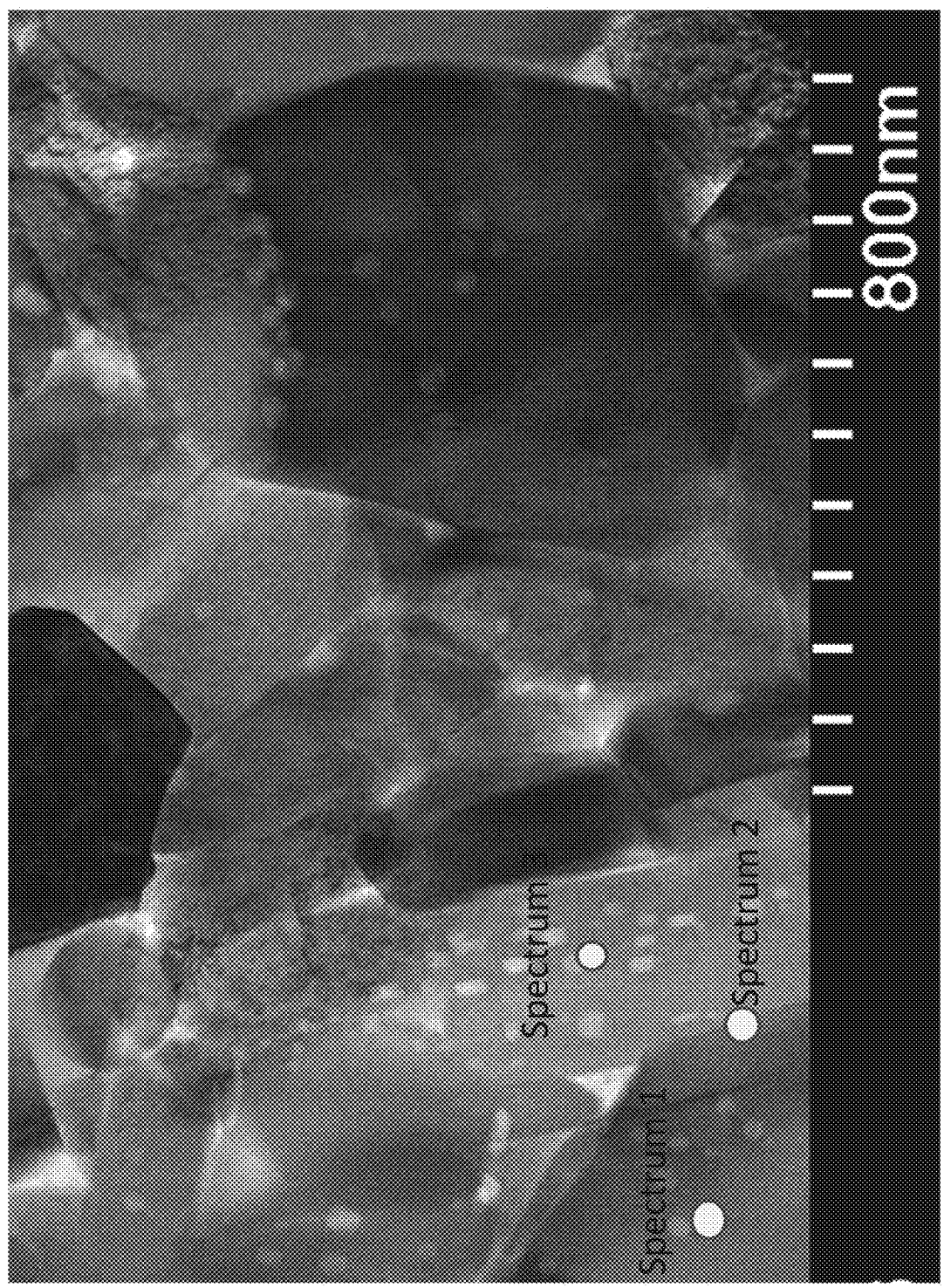
FIG. 5 illustrates a scanning transmission electron micrograph (STEM) image of a small section of a secondary particle according to one aspect as provided herein containing several crystallites from and prepared by enriching the grain boundaries with both 1.9 at % Al and 4 at % Co, and shows locations at which 3 EDS spot analyses were performed.
Figure 6:
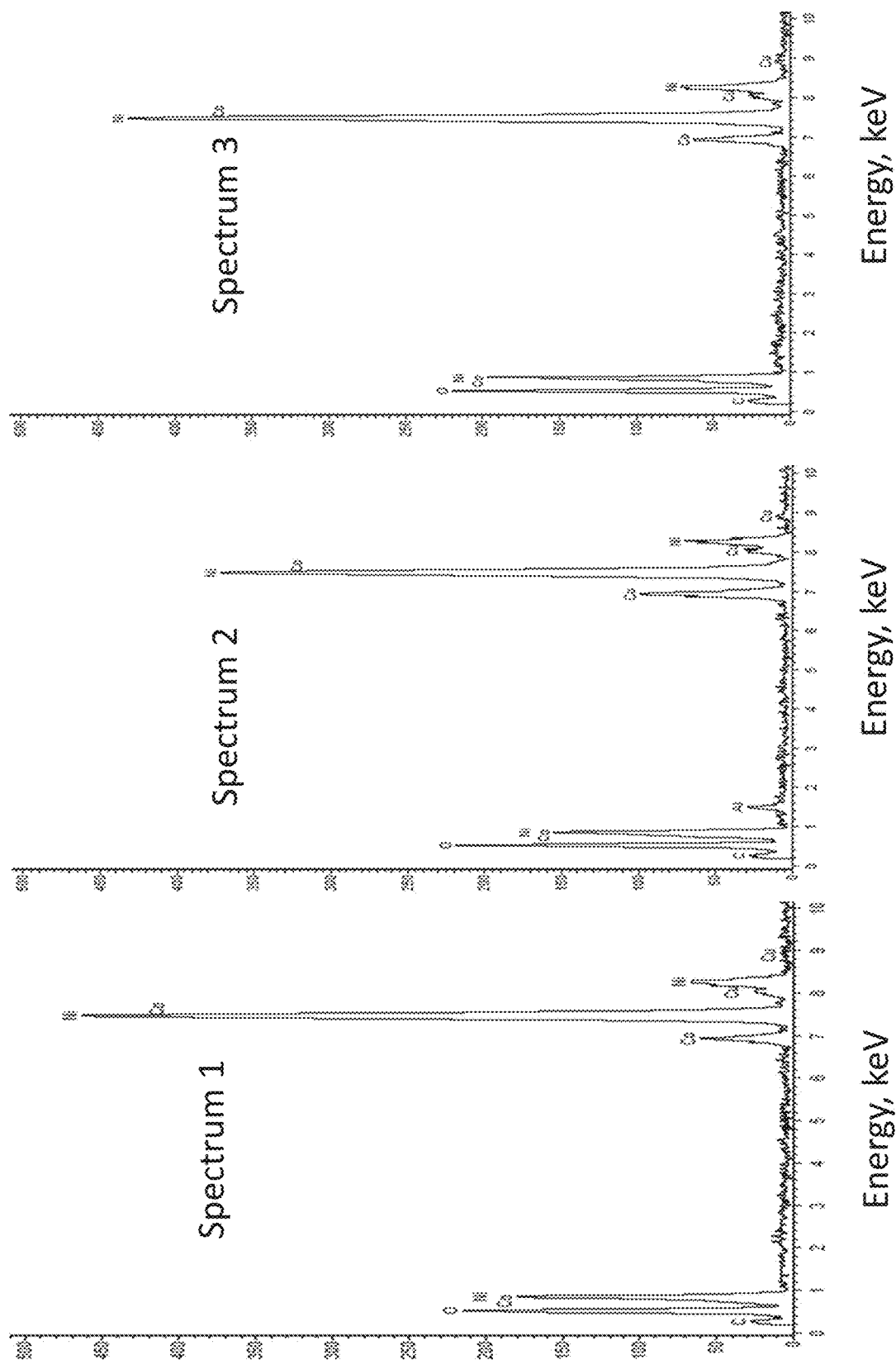
FIG. 6 illustrates the EDS spectra of the three spots indicted in FIG. 5.

Quantitative point analyses by STEM/EDS on thin lamellae of the 2 materials confirmed that inclusion of Co in the process formulation with Al promotes the uptake of Al into grain boundaries upon subsequent calcination. A secondary particle of each material coated on Cu foil as described above was sectioned by focused ion beam (FIB) milling to yield a thin lamella about 100 nm thick. FIG. 5 shows a scanning transmission electron micrograph (STEM) image of a small section containing several crystallites from a particle prepared by the grain-boundary-enrichment process in which both 1.9 at % Al and 4 at % Co were formulated in the process liquid, and shows locations at which 3 EDS spot analyses were performed, locations 1 and 3 being at the interiors of adjacent crystallites, and location 2 being at the intervening grain boundary. FIG. 6 shows the EDS spectra collected at the 3 locations marked in FIG. 5. Spectrum 2 at the grain boundary shows a clear peak for Al at about 1.5 keV whereas spectrum 1 and spectrum 3 at the crystallite interiors do not. Spectrum 2 at the grain boundary also indicates a higher ratio of Co to Ni than is seen in spectrum 1 and spectrum 3 at the crystallite interiors, as indicated by comparing the 6.9 keV Co peak to the 8.3 keV Ni peak in each spectrum. Quantitative results obtained by integrating the FIG. 6 spectra are shown in Table 3 illustrating that the spectrum 2 grain boundary location is enriched in both Al and Co.

TABLE 3

Results for 3 EDS point analyses of particles produced using a 1.9 at % Al, 4 at % Co process liquid material.

| | 1.9% Al, 4% Co in Process Liquid | | | | Co/(Co + Ni) | Al/(Co + Ni) |
| --- | --- | --- | --- | --- | --- | --- |
| | O | Ni | Co | Al | Atom Ratio | Atom Ratio |
| Spectrum 1 | 66.28 | 30.38 | 3.34 | ND | 0.10 | 0.00 |
| Spectrum 2 | 63.3 | 27.58 | 6.39 | 2.73 | 0.19 | 0.08 |
| Spectrum 3 | 64.55 | 31.48 | 3.97 | ND | 0.11 | 0.00 |

ND: Not Detectable

Figure 7:
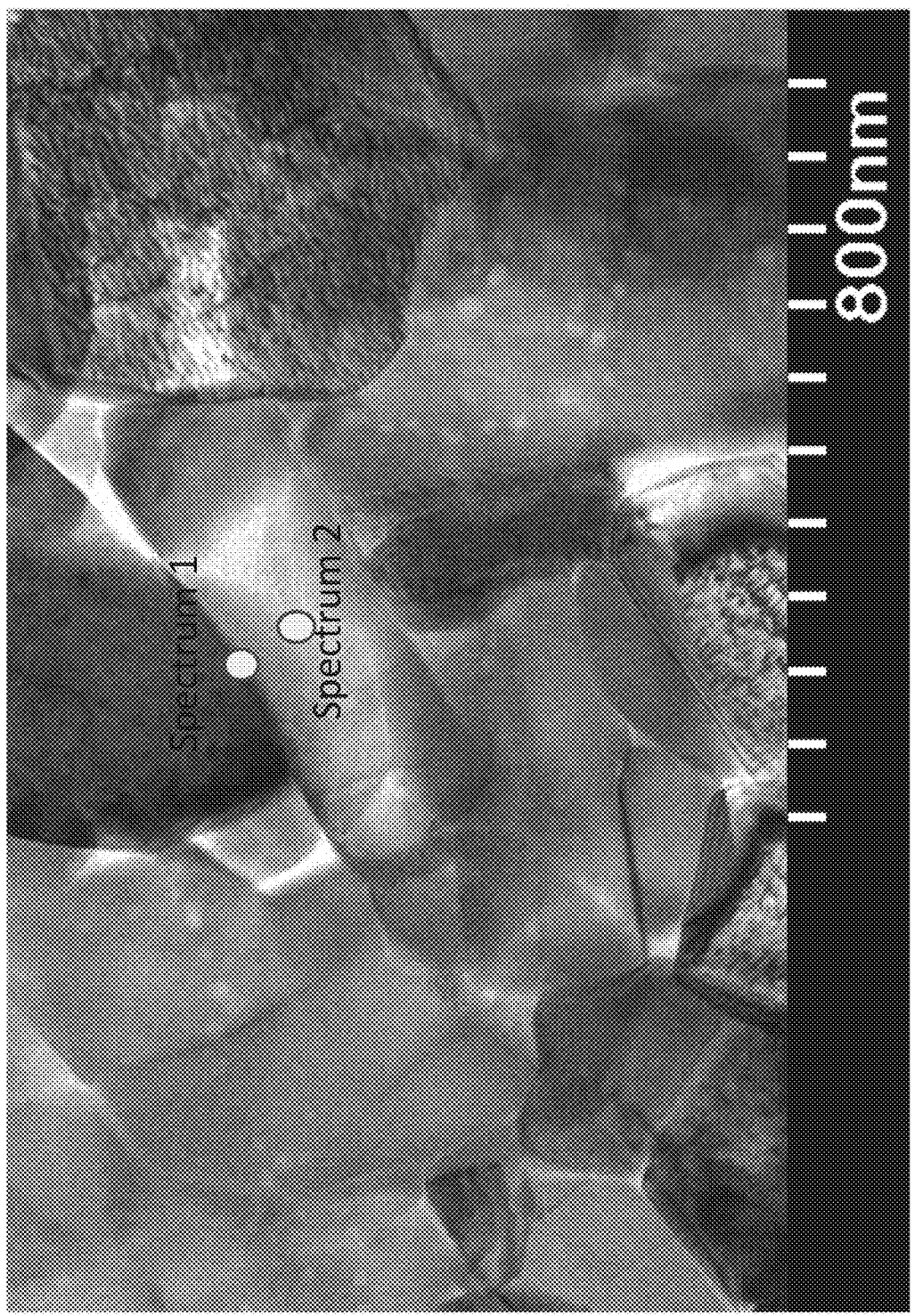
FIG. 7 illustrates a STEM image of a small section of a secondary particle according to one aspect as provided herein containing several crystallites from and prepared by enriching the grain boundaries with 1.9 at % Al in the absence of Co in the process solution, and shows locations at which 2 EDS spot analyses were performed.
Figure 8:
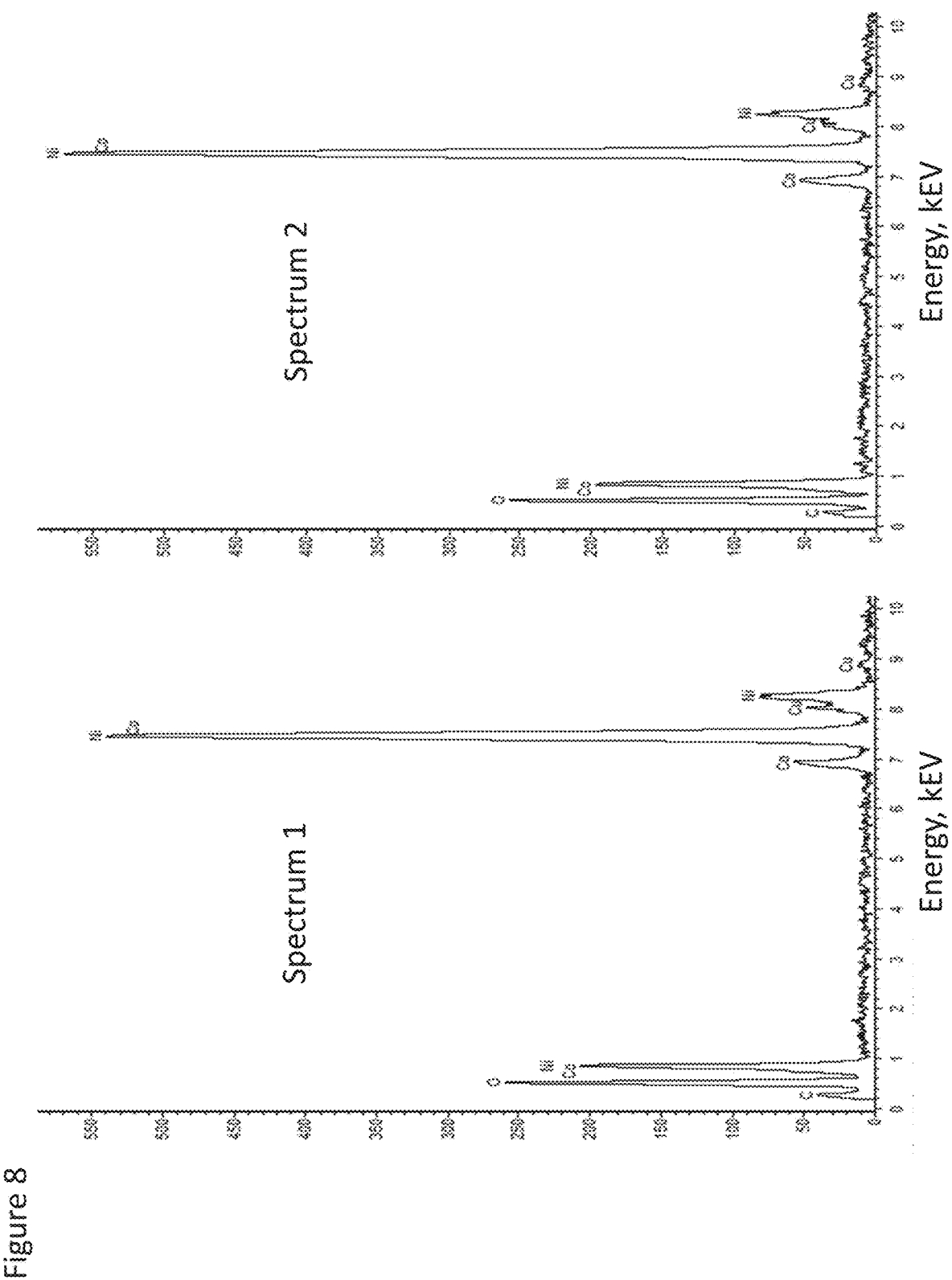
FIG. 8 illustrates the EDS spectra of the three spots indicted in FIG. 7.

The same type of STEM-EDS analyses were performed on a particle that had been prepared by the grain-boundary-enrichment process in which 1.9 at % Al was present in the process solution in the absence of Co, and a STEM image and locations of EDS point analyses are shown in FIG. 7. The location of spectrum 1 is at a grain boundary and that of spectrum 2 is at a crystallite interior. FIG. 8 shows the EDS spectra collected at the 2 locations marked in FIG. 7, and neither spectrum indicates the presence of Al, and there is little difference between their Co peaks. Quantitative results obtained by integrating the FIG. 8 spectra are shown in Table 4, and show that the grain boundary and bulk crystallite compositions are the same, indicating little or no Al uptake or grain boundary enrichment of the secondary particle.

TABLE 4

Results for 2 EDS point analyses of 1.9 at % Al only in the process liquid.

| | 1.9% Al in Process Liquid | | | | Co/(Co + Ni) | Al/(Co + Ni) |
| --- | --- | --- | --- | --- | --- | --- |
| | O | Ni | Co | Al | Atom Ratio | Atom Ratio |
| Spectrum 1 | 65.5 | 31.87 | 2.64 | ND | 0.08 | 0.00 |
| Spectrum 2 | 65.09 | 32.21 | 2.7 | ND | 0.08 | 0.00 |

STEM-EDS point analyses of the type described above were performed on a total of 11 grain boundary and 10 crystallite interior locations for the 1.9 at % Al, 4 at % Co grain boundary enriched material, and 16 grain boundary and 7 crystallite interior locations for the 1.9 at % Al-only enriched material. Table 5 gives the averaged results for those analyses in comparison to the bulk formulated compositions of the materials, and shows that whereas applying the liquid process with Al only and then calcining results in little or no Al enrichment of grain boundaries (measurable quantity of Al detected in 3 of 16 locations), processing with both Al and Co and then calcining results in substantial grain boundary enrichment with both elements.

TABLE 5

Averaged EDS point analysis results for grain boundaries (second composition) and crystallite interiors (first composition) of 1.9 at % Al only or 1.9 at % Al, 4 at % Co co-enriched materials.

| coating formulation | formulated Al/Ni atom ratio | formulated Co/Ni atom ratio | # GB points analyzed | average GB Al/Ni atom ratio | average GB Co/Ni atom ratio | # bulk points analyzed | average bulk Al/Ni atom ratio | average bulk Co/Ni atom ratio |
|---|---|---|---|---|---|---|---|---|
| 1.9% Al, no Co | 0.026 | 0.087 | 16 | 0.005 | 0.079 | 7 | 0.000 | 0.078 |
| 1.9% Al, 4% Co | 0.026 | 0.130 | 11 | 0.037 | 0.164 | 10 | 0.000 | 0.094 |

GB: grain boundaries
bulk: crystallite interiors

Figure 9:
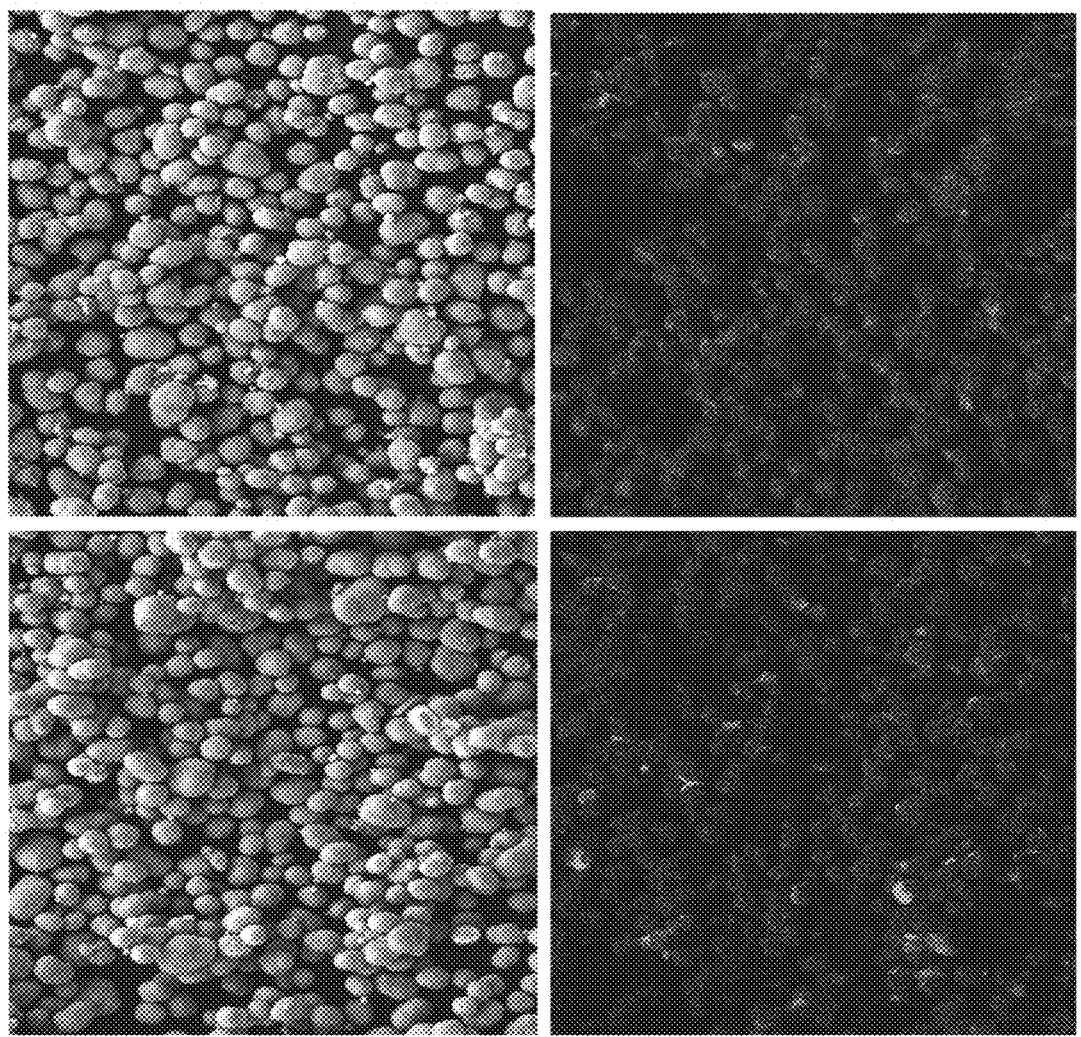
FIG. 9 illustrates EDS mapping of secondary particles as provided herein made by non-aqueous processing for grain boundary enrichment of raw particles during manufacture using Al alone or Al in the presence of Co in the process solution.

Example 2: Grain Boundary Enrichment with Both Al and Co Via a Nonaqueous Grain Boundary Enrichment Process Electrochemically active polycrystalline 2D α-NaFeO$_2$-type layered structure particles with differing types of grain boundary enrichment and each with high nickel in the cathode material were prepared via a nonaqueous grain boundary enrichment process. A material with composition Li$_{1.03}$Mg$_{0.01}$Ni$_{0.92}$Co$_{0.08}$O$_2$ was prepared by the method of Example 1. 30 g of this material was then dispersed in 40 ml of methanol containing 1.9 at % Al as dissolved nitrate salt together with or without 4 at % Co nitrate, and with sufficient LiNO$_3$ such that the final Li to transition metal+Al ratio was 1.01. The resulting slurry was rotary evaporated to dryness, and the recovered material then underwent the same calcination procedure that was applied to spray-dried material in Example 1. FIG. 9 shows Al EDS maps of the calcined materials, and shows that, as was seen for aqueous-process materials in Example 1, the material formulated only with Al had more intense and more numerous "hotspots" of Al than the material formulated with Co together with Al. This result shows that the role of solution-processing with Co in promoting the more uniform uptake of Al by secondary particles is not an artifact of the aqueous process, and that non-aqueous deposition of grain-boundary-enriching elements by solvent evaporation yields the same result as aqueous deposition via acid-base precipitation.

Example 3: Synergistic Benefit Obtained by Grain Boundary Enrichment with Both Al and Co Electrochemically active polycrystalline 2D α-NaFeO$_2$-type layered structure particles with differing types of grain boundary enrichment and each with high nickel in the cathode material were prepared from a Li$_{1.03}$Mg$_{0.01}$Ni$_{0.92}$Co$_{0.08}$O$_2$ base material via the methods of Example 1. The Al and Co process formulations used to make these materials are shown by the matrix in Table 6.

TABLE 6

Al and Co levels in the process solution used to make Example 3 grain boundary enriched materials.

| | Co (at %) | | | | |
|---|---|---|---|---|---|
| Al (at %) | 3 | 3.5 | 4 | 4.5 | 5 |
| 0 | X | X | X | X | X |
| 0.5 | X | X | X | X | |
| 1 | X | | X | | |
| 2 | X | | | | |
| 4 | X | | | | |

Figure 10:
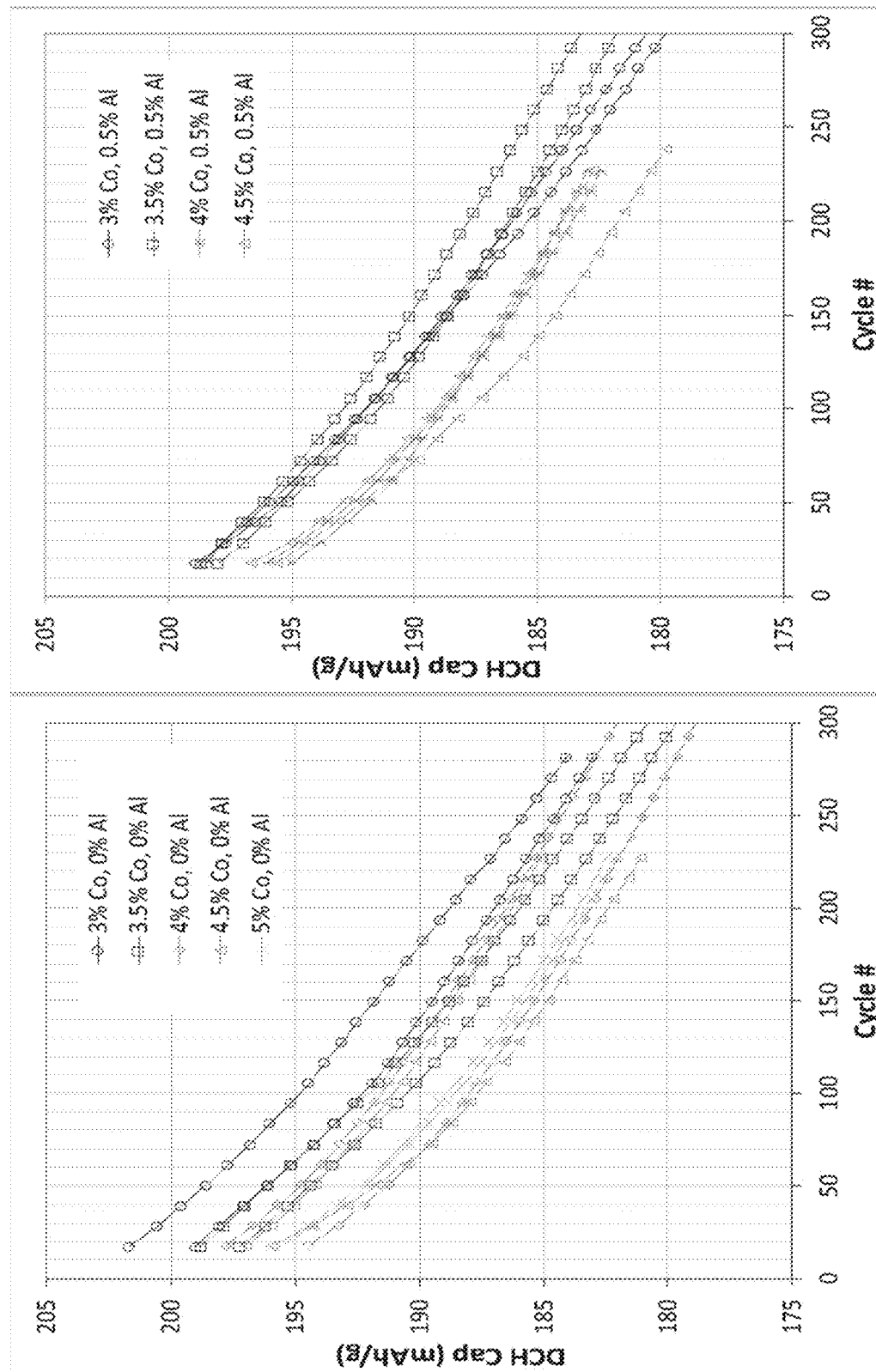
FIG. 10 illustrates cycling capacity fade for cells formed with a cathode incorporating active material grain boundary enriched according to an aspect as provided herein prepared with 0 at % Al in the process solution and with 0.5 at % Al in the process solution and their dependence on additional Co content.
Figure 11:
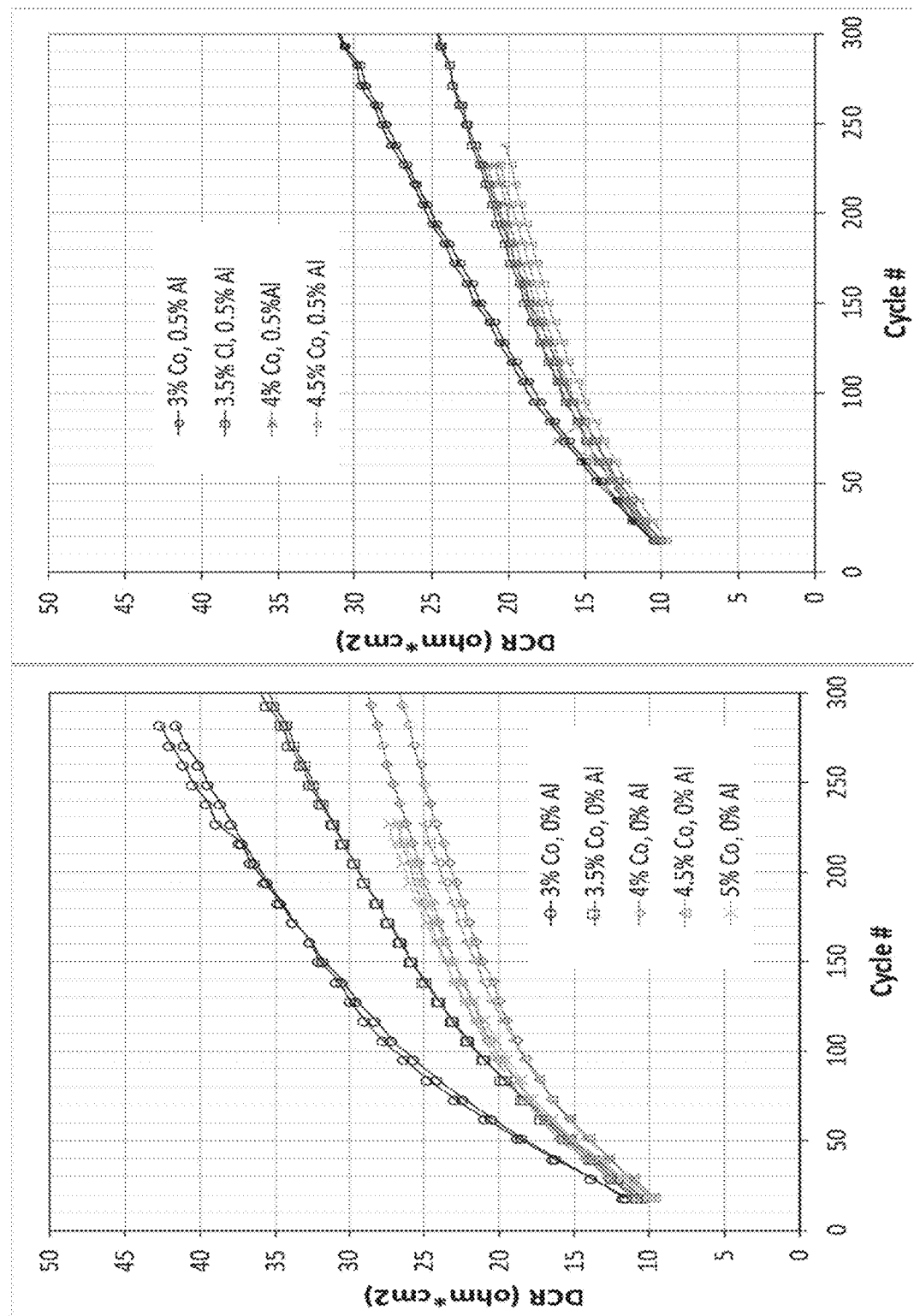
FIG. 11 illustrates impedance growth for cells formed with a cathode incorporating active material grain boundary enriched according to an aspect as provided herein prepared with 0 at % Al in the process solution and with 0.5 at % Al in the process solution and their dependence on additional Co content.
Figure 12:
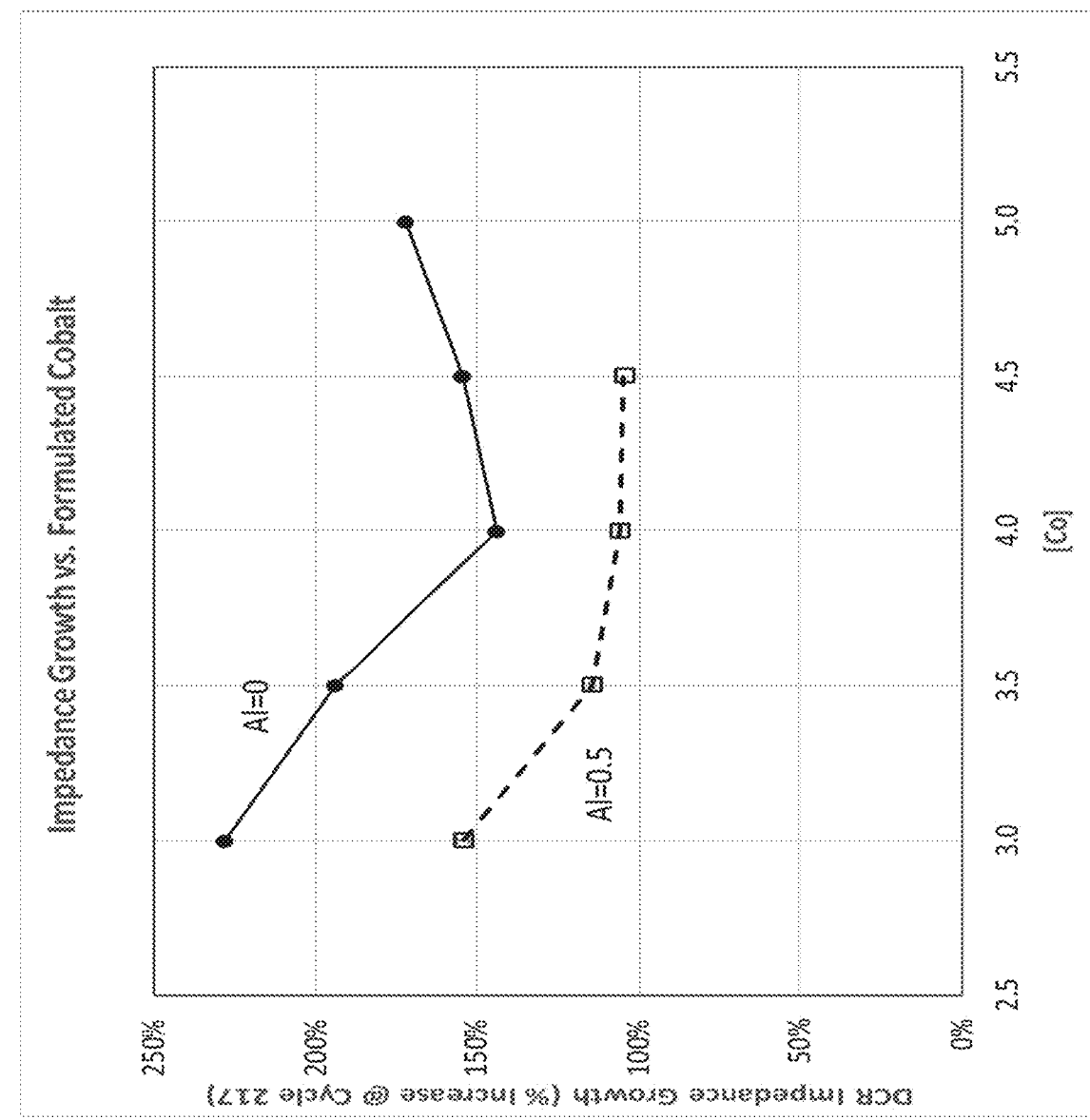
FIG. 12 illustrates a synergistic benefit observed from inclusion of Al in addition to Co enrichment in grain boundaries.

Li-ion coin cells were built with the materials enriched as in Table 6 and cycled per the methods of Example 1. FIG. 10 illustrates cycling capacity fade for the cells with 0 at % Al grain-boundary-enriched materials and with 0.5 at % Al grain-boundary-enriched materials and their dependence on formulated Co content. The capacities of the various materials decrease with increased Co in the formulations, but their rates of capacity fade do not differ greatly, being in the 4% to 6% range over 200 cycles, and are not substantially impacted by the inclusion or absence of 0.5 at % Al in the formulations. However, FIG. 11 shows that increasing the Co level in the formulation reduces impedance growth, with 4.2V impedance growth at 200 cycles decreasing from 250% to 130% as the formulated Co level is increased from 3 at % to 4 at %, and that further inclusion of 0.5 at % Al in the solution process formulation substantially reduces impedance growth at all levels of Co in the formulation, with impedance growth at 200 cycles dropping from 150% to 90% as the Co level in the solution process formulation is increased from 3 at % to 4.5 at %. FIG. 12 further shows that a synergistic benefit is observed from inclusion of Al in the solution process formulation, with impedance being reduced by a greater amount than can be obtained by only further increasing the Co concentration.

Figure 13:
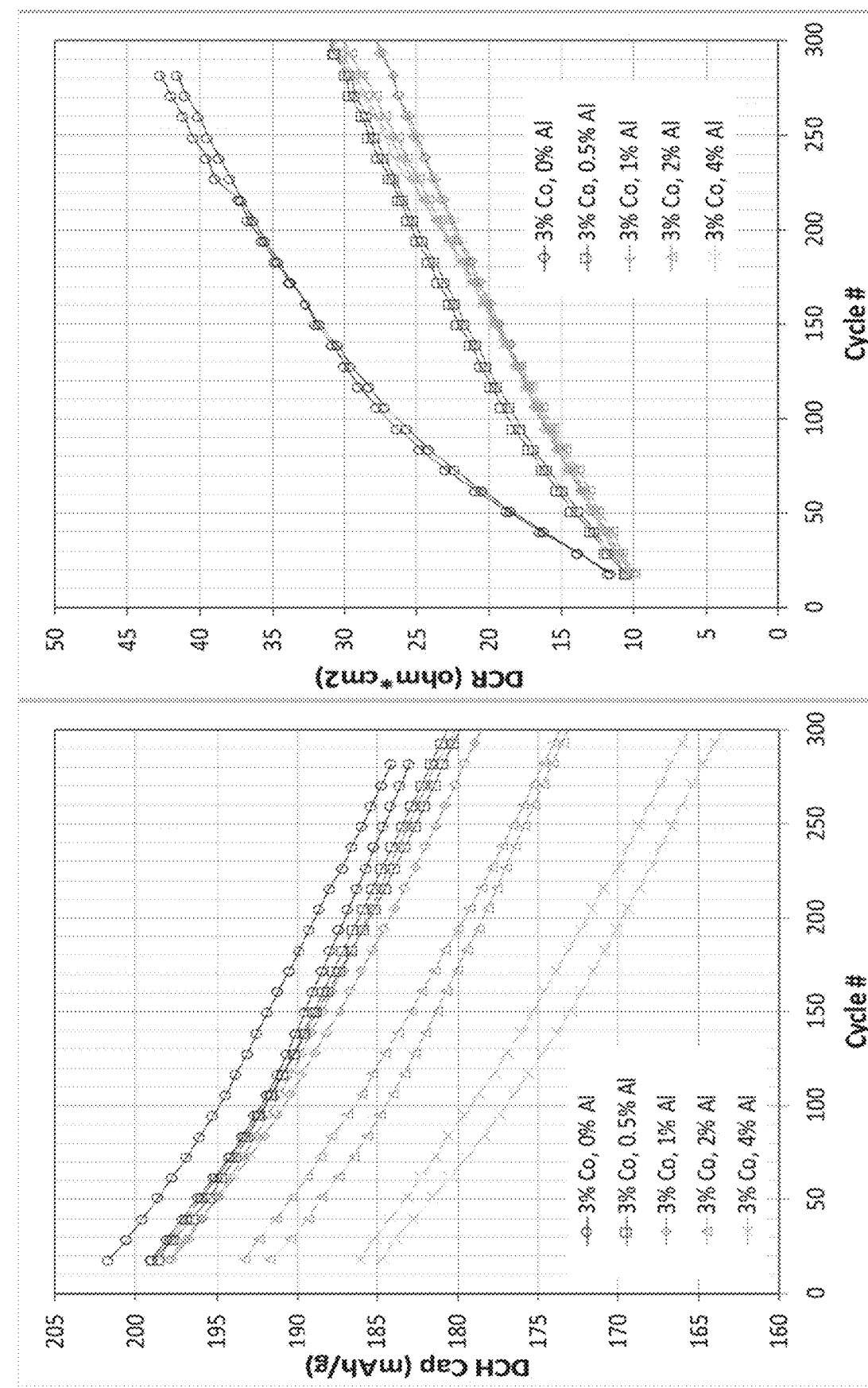
FIG. 13 illustrates cycling capacity fade and impedance growth for cells with cathode materials that were grain boundary enriched according to some aspects as provided herein from 3 at % Co process application with varied Al levels.
Figure 14:
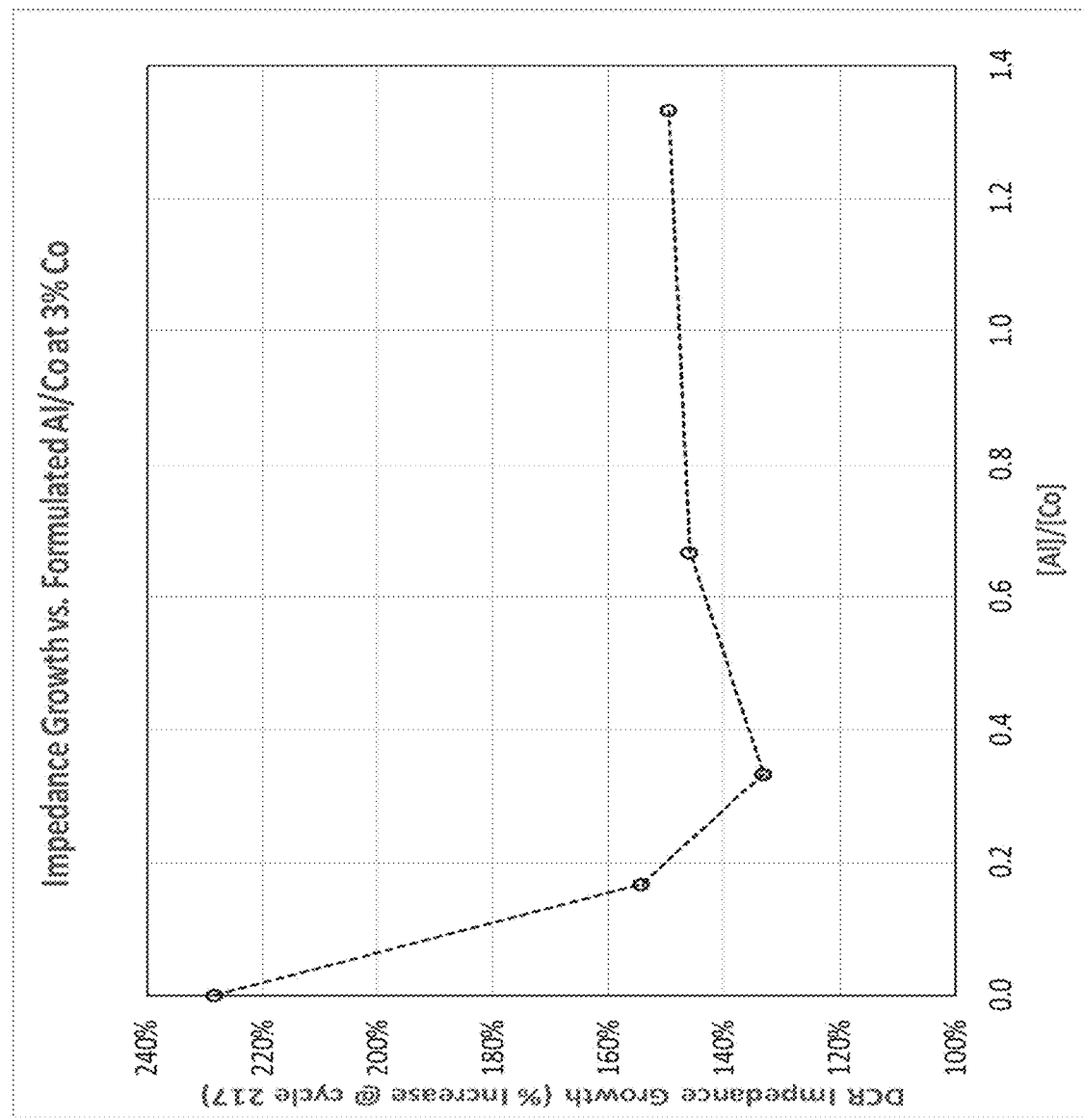
FIG. 14 illustrates impedance growth at various Al/Co enrichment atomic percent ratios for cathode active materials as provided herein according to some aspects.

FIG. 13 shows cycling capacity fade (left) and impedance growth (right) for cells with cathode materials grain boundary enriched from 3 at % Co solution process formulation with varied Al levels. The figure shows that increasing the formulated Al level decreases the cathode material's capacity without significantly impacting capacity fade (all cells faded in the 6%-8% range over 200 cycles), but that increasing the formulated Al level from 0 at % to 1 at % reduces 4.2V impedance growth at 200 cycles from 200% to 120%, while even higher Al levels cause impedance growth to increase slightly. The impedance increases plotted in FIG. 13 are summarized in FIG. 14, which shows that for 3 at % Co in the process solution together with Al, minimum impedance growth is obtained when the process solution's formulated atomic % ratio of Al/Co is about 0.3-0.4.

Example 4: Al and Co Grain Boundary Enrichment of an NCA Material

Two NCA materials of similar overall composition were made, one having Co and Al grain boundary enrichment and one not. In each case, a base material was made by blending hydroxide precursors together and firing in an oxygen atmosphere until a final lithiated oxide was formed and sintered.

Material 1: NCA base material having first composition LiNi$_{0.93}$Co$_{0.04}$Al$_{0.03}$O$_2$, grain boundary-enriched with additional 4 at % Co, 0.6 at % Al relative to total M in the first composition.

A precursor transition metal hydroxide was used for this process. It contained at transition metal 4 at % Co and 3 at % Al and the balance Ni. A micronized LiOH powder was made by placing 51 g of LiOH into a plastic jar with 500 g of Y-stabilized zirconia ¼" spheres and shaking on a paint shaker for 45 minutes. This micronized powder was then transferred to another plastic jar containing 190.15 g of the transition metal hydroxide precursor and the two powders were blended by shaking the jar on a paint shaker for a further 10 minutes. After blending, the roughly 240 g of blended powder was split between two crucibles and fired in an oxygen atmosphere by first ramping to 450° C. at 5° C./min and soaking at temperature for 2 hours, and then ramping to 680° C. at 2° C./min and soaking for 6 hours. When this heating regime was over, the furnace was allowed to cool to 130° C. and the powder was removed and placed into a jar mill. The jar mill contained ½" drum media and was used to mill the powder for 2 minutes. The powder was then sieved through a 270 mesh sieve. The material was analyzed by XRD demonstrating an α-NaFeO$_2$-type structure.

Figure 15:
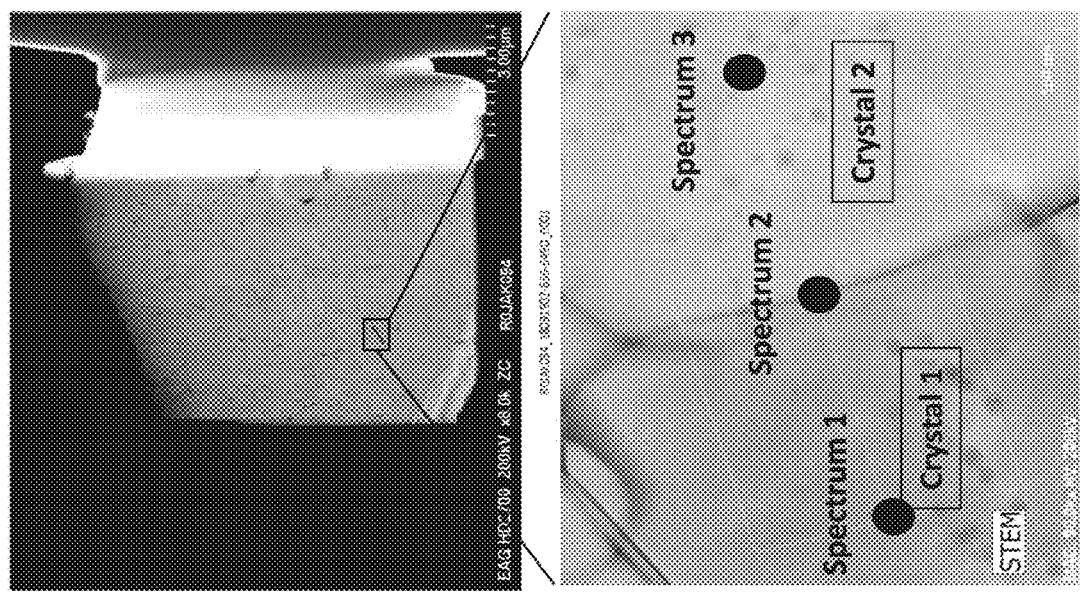
FIG. 15 illustrates STEM and results for EDS analyses of 3 spots in a small section of a secondary particle of NCA that was prepared as provided herein, being grain boundary enriched with Al in the presence of Co.

The powder was then coated with Co and Al by making a solution of 80 g water, 9.5 g cobalt nitrate (4 at % Co relative to total M in LiMO$_2$ base composition), 1.9 g aluminum nitrate (0.6 at % Al relative to total M in LiMO$_2$ base composition), 2.7 g lithium nitrate and heating to 60° C. To this was added 80 g of the previously prepared powder. The slurry was allowed to stir for 25 minutes after which it was spray dried to remove the water from the slurry and prepare a dry powder. This powder was then fired in an air atmosphere by first heating to 450° C. at 5° C./min and soaking for 1 hour and then heating at 2° C./min to 700° C. and soaking for 2 hours. The furnace was then allowed to cool to 130° C. and the powder removed from the furnace and sieved through a 270 mesh sieve. FIG. 15 shows STEM micrographs of a thinly sectioned secondary particle of the thus-prepared material that was coated on Cu foil as described in Example 1. FIG. 15 also provides the Al/Ni and Co/Ni atomic ratio results for 3 EDS point analyses of an interior grain boundary (GB) and bulk areas of the adjacent primary particles, showing that the grain boundary is enriched with both Co and Al.

Material 2: comparative NCA base material having homogeneous first composition LiNi$_{0.89}$Co$_{0.08}$Al$_{0.03}$O$_2$ A precursor transition metal hydroxide was used for this process. It contained 8 at % Co and 3 at % Al and the balance Ni. A micronized LiOH powder was made by placing 25.5 g of LiOH into a plastic jar with 500 g of Y-stabilized zirconia ¼" spheres and shaking on a paint shaker for 45 minutes. This micronized powder was then transferred to another plastic jar containing 95.1 g of the transition metal hydroxide and the two blended by shaking on a paint shaker for a further 10 minutes. After blending, the roughly 120 g of powder was placed in one crucible and fired in an oxygen atmosphere by first ramping to 450° C. at 5° C./min and soaking at temperature for 2 hours, and then ramping to 680° C. at 2° C./min and soaking for 6 hours. The furnace was then allowed to cool to 130° C. and the powder was removed and placed into a jar mill. The jar mill contained ½" drum media and was used to mill the powder for 2 minutes. The powder was then sieved through a 270 mesh sieve. The material was analyzed by XRD demonstrating an α-NaFeO$_2$-type structure.

Figure 16:
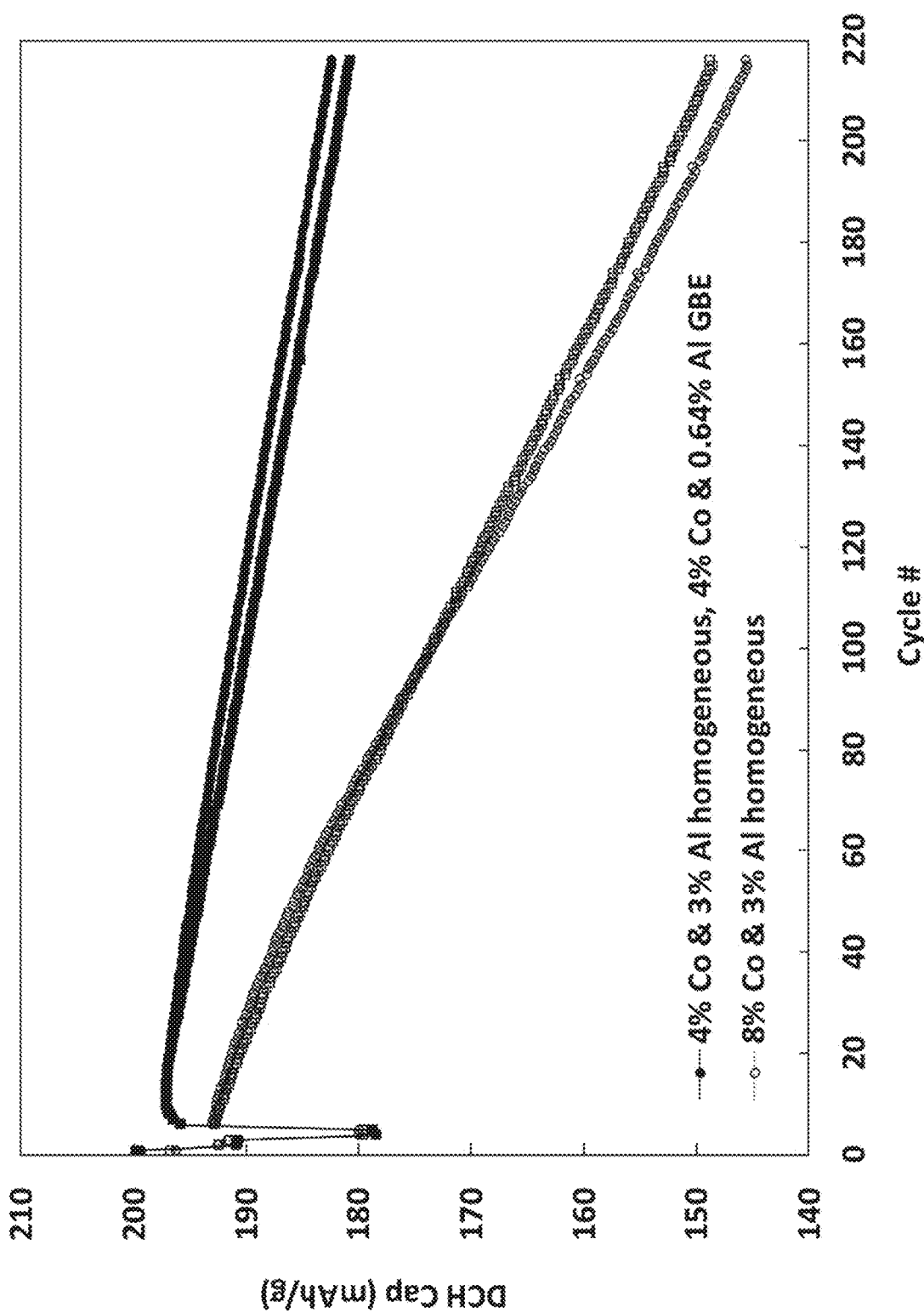
FIG. 16 illustrates cycling capacity fade for cells formed with a cathode incorporating control or grain boundary enriched NCA active material according to an aspect as provided herein.
Figure 17:
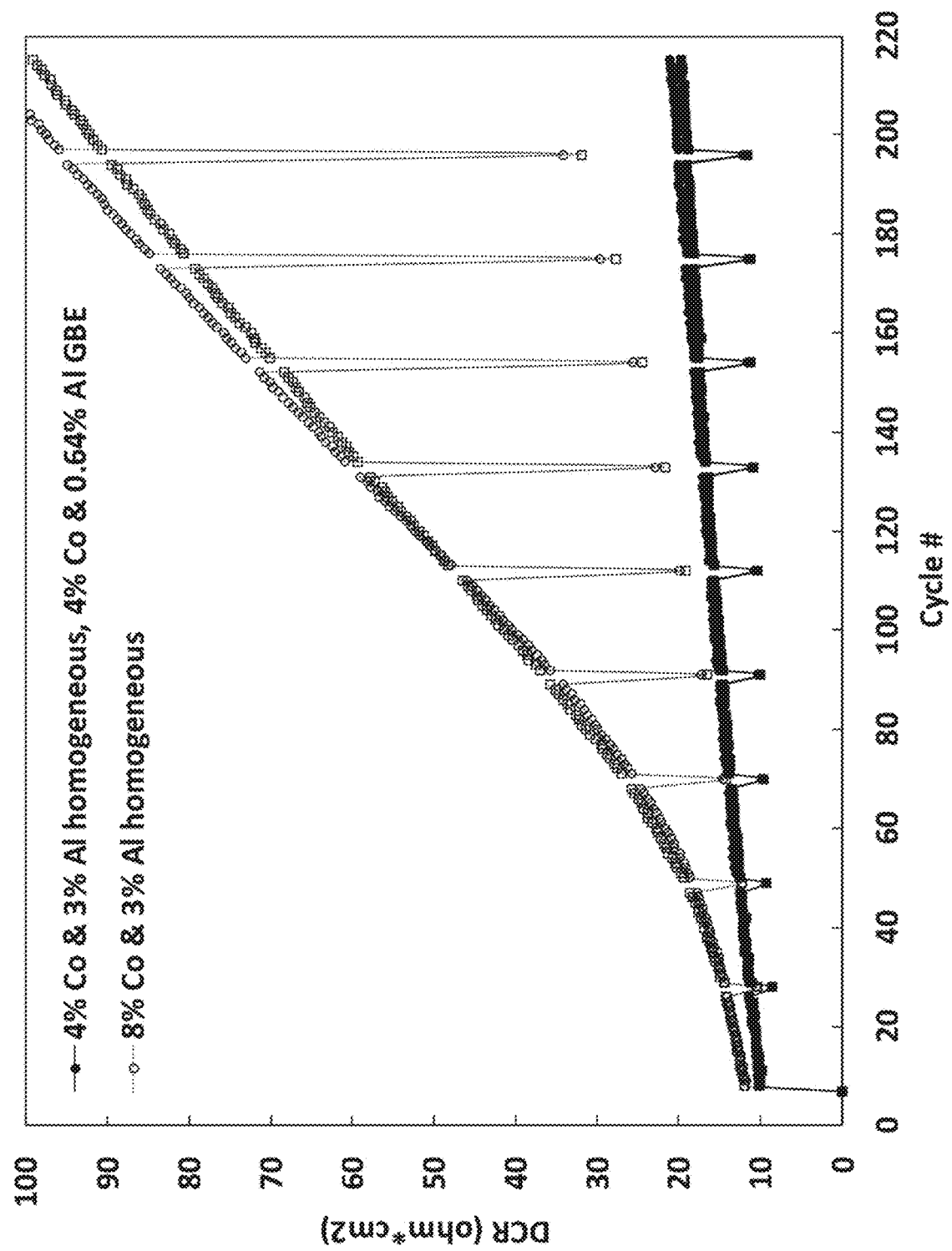
FIG. 17 illustrates impedance growth for cells formed with a cathode incorporating control or grain boundary enriched NCA active material according to an aspect as provided herein.

The above cathode materials 1 and 2 were assembled in coin cells as described in Example 1. The cells were 1C/1C cycled at 45° C., with 10 second discharge DCR being measured at 100% state of charge (SOC) for every cycle and at 50% SOC every 20$^{th}$ cycle. The capacity fade and impedance growth results for 2 cells Li-ion coin cells made with each material are presented in FIG. 16 and FIG. 17, respectively. Although the overall compositions of the two materials were nearly equivalent, the grain boundary-enriched material #1 contained Co enriched between bulk crystallites in the grain boundaries while material #2 contained an equivalent overall amount of Co uniformly distributed throughout the secondary particle. Material #1 had only slightly higher overall Al content than material #2, but the excess Al (~16% more Al than material #2) was all concentrated in the grain boundaries. Both capacity fade and impedance growth were much improved for the GBE material when compared to the uniform-composition material. FIG. 16 shows that the grain boundary-enriched material #1, in addition to having slightly higher capacity (~1%) than the homogeneous material #2, had only 8% capacity fade in 200 cycles as compared to >30% fade for material #2. FIG. 17 shows that cells with grain boundary-enriched material #1 had 100% impedance growth at full SOC (4.2V) and 30% impedance growth at 50% SOC after 200 cycles, while cells with material #2 had >800% impedance growth at full SOC and >200% impedance growth at 50% SOC after 200 cycles.

Example 5: Al and Co Grain Boundary Enrichment of an NCM Material

An NCM base material having first composition LiNi$_{0.8}$Co$_{0.1}$Mn$_{0.1}$O$_2$ (NCM 811) was prepared from co-precipitated precursor transition metal hydroxide containing 10 at % Co and 10 at % Mn and the balance Ni. A micronized LiOH powder was made by placing 87.7 g of LiOH into a plastic jar with 500 g of Y-stabilized zirconia ¼" spheres and shaking on a paint shaker for 45 minutes. This micronized powder was then transferred to another plastic jar containing 335.7 g of the precursor transition metal hydroxide and the two blended by shaking on a paint shaker for a further 10 minutes. After blending, the roughly 440 g of powder was split between three crucibles and fired in an oxygen atmosphere by first ramping to 450° C. at 5° C./min and soaking at temperature for 2 hours, and then ramping to 770° C. at 2° C./min and soaking for 10 hours at 770° C. The furnace was then allowed to cool to 130° C. and the powder was removed and placed into a jar mill. The jar mill contained ¾" drum media and was used to mill the powder for 2 minutes. The powder was then sieved through a 270 mesh sieve.

Figure 18:
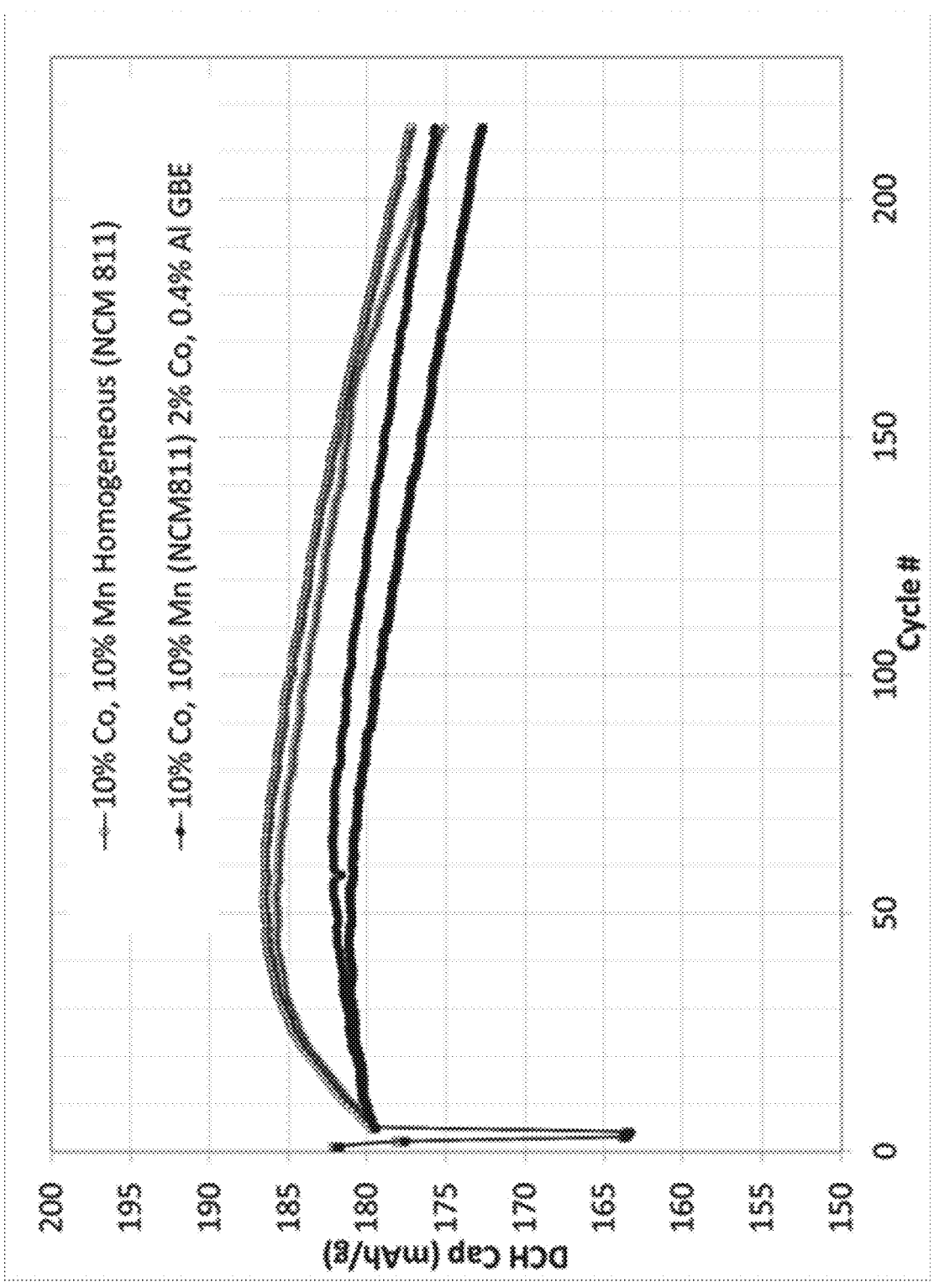
FIG. 18 illustrates cycling capacity fade for cells formed with a cathode incorporating control or grain boundary enriched NCM active material according to an aspect as provided herein.
Figure 19:
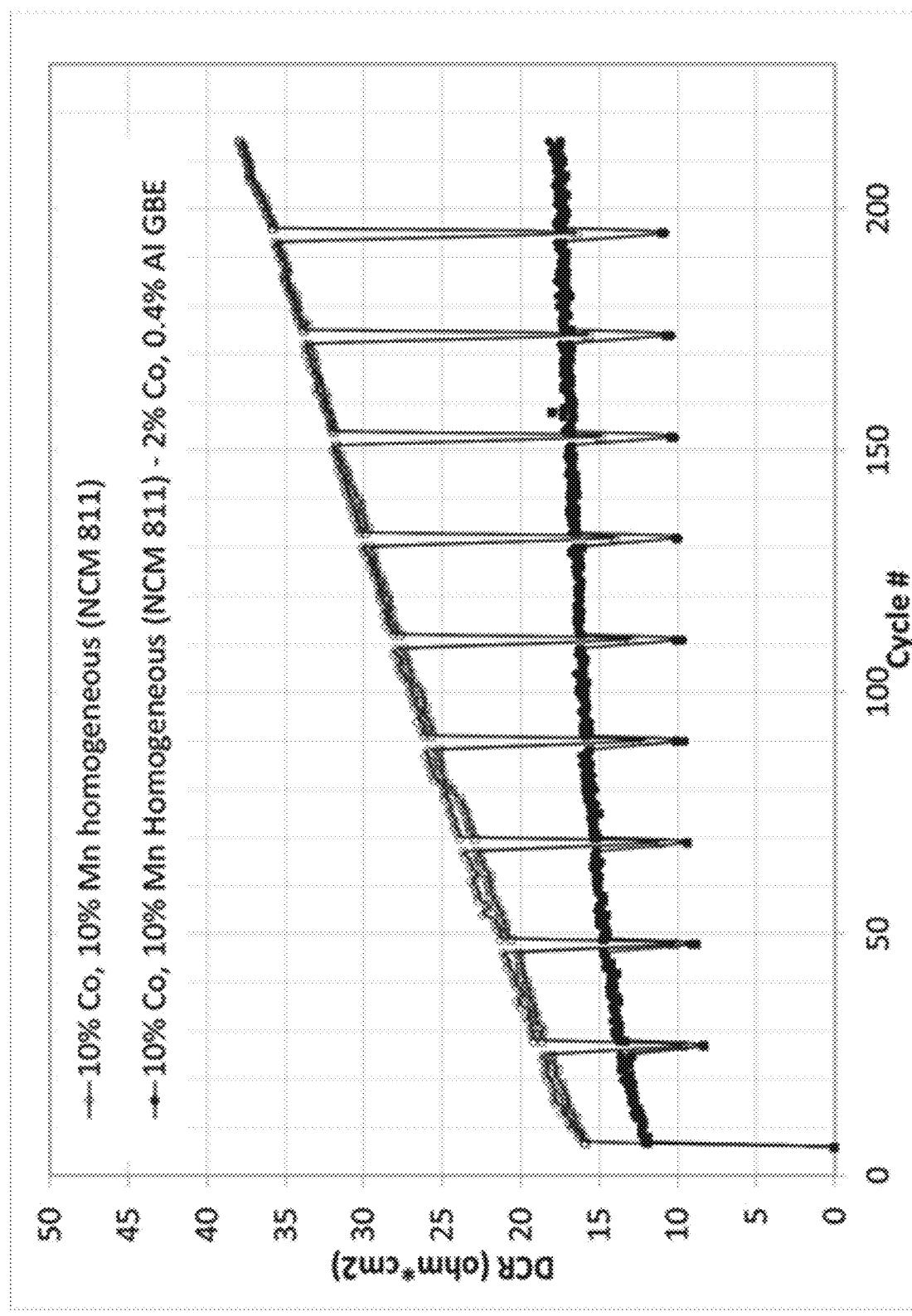
FIG. 19 illustrates impedance growth for cells formed with a cathode incorporating control or grain boundary enriched NCM active material according to an aspect as provided herein.

The powder was then divided into base (no further treatment) or grain-boundary-enriched with Co and Al by making a solution of 200 g water, 11.9 g cobalt nitrate (2 at % Co relative to base composition), 3.1 g aluminum nitrate (0.4 at % Al), 3.4 g lithium nitrate and heating to 60° C. To this was added 200 g of the previously prepared lithiated precursor powder. The slurry was allowed to stir for 10 minutes after which it was spray dried to remove the water from the slurry and prepare a dry powder. This powder was then fired in an air atmosphere by first ramping to 450° C. at 5° C./min and soaking at temperature for 1 hour, and then ramping to 770° C. at 2° C./min and soaking for 0.25 hour. The furnace was then allowed to cool to 130° C. and the powder was removed from the furnace and sieved through a 270 mesh sieve. The overall composition of the synthesized cathode powder was LiNi$_{0.079}$Co$_{0.11}$Mn$_{0.09}$Al$_{0.006}$O$_2$ The above base and grain boundary enriched NCM materials were then assembled in Li-ion coin cells which were cycled at 45° C. by methods described in Examples 1 and 4. The capacity fade and impedance growth results for 2 cells Li-ion coin cells made with each material are presented in FIG. 18 and FIG. 19, respectively. Both materials had good cycling stability (FIG. 18), with the grain boundary-enriched material fading slightly less (about 4% fade in 200 cycles vs. about 5% fade for the base material) and having a somewhat lower initial capacity. Nonetheless, the grain boundary enriched material had much lower impedance growth than the similar composition, homogeneous base material (FIG. 19), having 45% impedance growth at 100% SOC and 38% impedance growth at 50% SOC after 200 cycles, as compared to 225% impedance growth at 100% SOC and 70% impedance growth at 50% SOC after 200 cycles for the base material. These results demonstrate that grain boundary enrichment with relatively low levels of Al and Co is beneficial to NCM.

Various modifications, in addition to those shown and described herein, will be apparent to those skilled in the art of the above description. Such modifications are also intended to fall within the scope of the disclosure.

It is appreciated that all reagents are obtainable by sources known in the art unless otherwise specified.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof.

The invention claimed is:

1. An electrochemical cell, comprising:
an anode,
an electrolyte, and
a cathode, the cathode comprising an electrochemically active cathode active material comprising a plurality of particles, said plurality of particles comprising a plurality of crystallites each comprising a first composition comprising lithium, nickel, and oxygen;
a grain boundary between adjacent crystallites of the plurality of crystallites and comprising a second composition having a layered α-NaFeO$_2$-type structure, a cubic structure, a spinel structure, or a combination thereof;
wherein the electrochemically active cathode active material has an initial discharge capacity of 180 mAh/g or greater; and
wherein the electrochemical cell has an impedance growth at 4.2V less than 50% for greater than 100 cycles at 45° C.

2. The cell of claim 1, wherein the electrochemical cell has an impedance growth at 4.2V less than 120% for greater than 200 cycles at 45° C.

3. The electrochemical cell of claim 1 characterized by an impedance growth at 50% state of charge of less than 50% for greater than 200 cycles at 45° C.

4. The cell of claim 1, wherein each of the crystallites comprise lithium, nickel, cobalt, and oxygen.

5. The cell of claim 4, wherein each of the crystallites further comprise Al.

6. The cell of claim 4, wherein each of the crystallites further comprise Mn.

7. The cell of claim 4, wherein each of the crystallites further comprise Mg.

8. The cell of claim 1, wherein the first composition and the second composition have the same elements.

9. The cell of claim 1, wherein the first composition is defined by Li$_{1+x}$MO$_{2+y}$, wherein $-0.95 \leq x \leq 0.3$, $-0.3 \leq y \leq 0.3$, and wherein M comprises nickel at greater than or equal to 80 atomic percent.

10. The cell of claim 9, wherein M further comprises one or more elements selected from the group consisting of Mg, Sr, Co, Al, Ca, Cu, Zn, Mn, V, Ba, Zr, Ti, Nb, Ta, Cr, Fe, Mo, W, Hf, and B, said one or more elements residing in a Li layer, a M layer, or both, of the crystallites.

11. The cell of claim 9, wherein M comprises an atomic percent of nickel greater than or equal to 90 percent.

12. The cell of claim 1, wherein the crystallites comprise cobalt, with the cobalt concentration in the range of 1 at % to about 50 at % relative to total transition metal the first composition.

13. The cell of claim 1, wherein the crystallites comprise cobalt, with the cobalt concentration in the range of 1 at % to about 15 at % relative to total transition metal in the crystallites.

14. The cell of claim 1, wherein the crystallites comprise Co and Mg.

15. The cell of claim 1, wherein the second composition comprises Al.

16. The cell of claim 1, wherein the first composition excludes Al.

17. The cell of claim 1, wherein the Al in the second composition is substantially uniformly distributed throughout said plurality of particles.

18. The cell of claim 1, wherein Al is present at less than 4 atomic percent relative to total transition metal in the first composition.

* * * * *